US011882029B2

(12) United States Patent
Saad et al.

(10) Patent No.: US 11,882,029 B2
(45) Date of Patent: Jan. 23, 2024

(54) SECURING MULTIPROTOCOL LABEL SWITCHING (MPLS) PAYLOADS

(71) Applicant: Juniper Networks, Inc., Sunnyvale, CA (US)

(72) Inventors: Tarek Saad, Greely (CA); Manish Talwar, Lunenburg, MA (US); Raveendra Torvi, Mountain House, CA (US); Ajay Kachrani, Nashua, NH (US); Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/663,319

(22) Filed: May 13, 2022

(65) Prior Publication Data
US 2023/0370369 A1 Nov. 16, 2023

(51) Int. Cl.
*H04L 45/50* (2022.01)
*H04L 45/00* (2022.01)
*H04L 69/22* (2022.01)
*H04L 9/40* (2022.01)

(52) U.S. Cl.
CPC ............. *H04L 45/50* (2013.01); *H04L 45/66* (2013.01); *H04L 63/0464* (2013.01); *H04L 63/061* (2013.01); *H04L 69/22* (2013.01)

(58) Field of Classification Search
CPC ..... H04L 29/06; H04L 12/815; H04L 12/805; H04L 12/935; H04L 67/10; H04L 45/50; H04L 49/20; H04L 67/2804
See application file for complete search history.

(56) References Cited

U.S. PATENT DOCUMENTS

2008/0137845 A1 6/2008 Wood
2016/0088068 A1* 3/2016 Toy ............... H04L 63/0272
                                          709/219
2019/0394180 A1* 12/2019 Spahn ............ H04L 43/10
(Continued)

OTHER PUBLICATIONS

Extended European Search Report for Application No. EP22178705.4 dated Sep. 8, 2022, 9 pages.
(Continued)

*Primary Examiner* — Iqbal Zaidi
(74) *Attorney, Agent, or Firm* — Harrity & Harrity, LLP

(57) ABSTRACT

In some implementations, an ingress network device of a multiprotocol label switching (MPLS) network may receive a packet destined for a destination network device. The ingress network device may determine, based on the packet, a secure function to secure the packet and a label associated with a label-switched path (LSP) from the ingress network device to an egress network device of the MPLS network that is associated with the destination network device. The ingress network device may encrypt, using the secure function, the packet to generate an encrypted packet. The ingress network device may generate an MPLS packet comprising: an MPLS header that includes the label and a secure function indicator, a secure MPLS data header that includes information identifying the secure function, and an MPLS payload that includes the encrypted packet. The ingress network device may forward, based on the label, the MPLS packet.

20 Claims, 22 Drawing Sheets

(56) References Cited

U.S. PATENT DOCUMENTS

2022/0116319 A1* 4/2022 Dutta .................. H04L 45/64

OTHER PUBLICATIONS

Tissa Senevirathne Internet Draft Document: draft-tsenevir-smpls-02.txt Category: Informational: "Secure MPLS—Encryption and Authentication of MPLS Payloads;" Internet Engineering Task Force, IETF; Internet Society (ISOC) 4, Rue Des Falaises CH-1205 Geneva, Switzerland, No. 2, Jul. 1, 2002, XP 015005549.

* cited by examiner

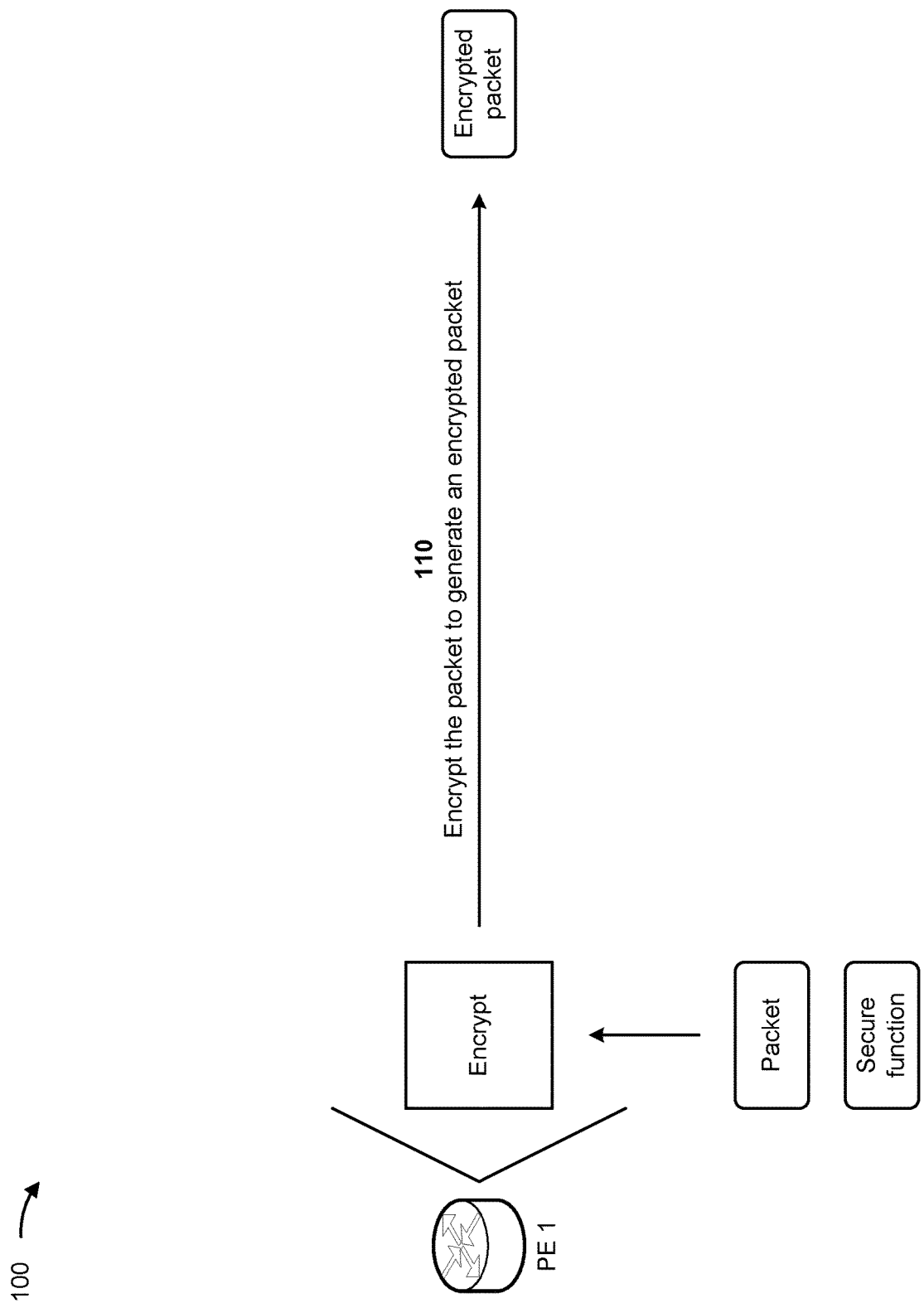

Example MPLS header

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                Transport Label.              | TC |S|   TTL   |
+-+-+-+-+-+-+-+-+-+-+-+-+-+-+-+-+-+-+-+-+-+-+-+-+-+-+-+-+-+-+-+-+
|         Base Special Purpose Label           |y f f|S|f f f f x|
+-+-+-+-+-+-+-+-+-+-+-+-+-+-+-+-+-+-+-+-+-+-+-+-+-+-+-+-+-+-+-+-+
~                                                               ~
+-+-+-+-+-+-+-+-+-+-+-+-+-+-+-+-+-+-+-+-+-+-+-+-+-+-+-+-+-+-+-+-+
|b b b b|                   Ancillary Data                      |
+-+-+-+-+-+-+-+-+-+-+-+-+-+-+-+-+-+-+-+-+-+-+-+-+-+-+-+-+-+-+-+-+
~                          Ancillary Data                       ~
+-+-+-+-+-+-+-+-+-+-+-+-+-+-+-+-+-+-+-+-+-+-+-+-+-+-+-+-+-+-+-+-+
```

FIG. 1E

Example secure MPLS data header

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| SubType       | Length        |          | Next Type     |
+-+-+-+-+-+-+-+-+-+-+-+-+-+-+-+-+-+-+-+-+-+-+-+-+-+-+-+-+-+-+-+-+
|                  Security Parameter Index (SPI)              |
+-+-+-+-+-+-+-+-+-+-+-+-+-+-+-+-+-+-+-+-+-+-+-+-+-+-+-+-+-+-+-+-+
|                  Sequence Number (64 bits).                  |
+-+-+-+-+-+-+-+-+-+-+-+-+-+-+-+-+-+-+-+-+-+-+-+-+-+-+-+-+-+-+-+-+
|                  Authentication Data (variable..)            ~
~-+-+-+-+-+-+-+-+-+-+-+-+-+-+-+-+-+-+-+-+-+-+-+-+-+-+-+-+-+-+-+-+
```

FIG. 1F

SECURING MULTIPROTOCOL LABEL SWITCHING (MPLS) PAYLOADS

BACKGROUND

In a label switching network, data packets are forwarded from an ingress network device to an egress network device based on labels of the data packets (e.g., rather than using network Internet protocol (IP) addresses). A path of a data packet through the label switching network is referred to as a label-switched path (LSP).

SUMMARY

Some implementations described herein relate to a method. The method may include receiving, by an ingress network device of a multiprotocol label switching (MPLS) network, a packet destined for a destination network device. The method may include determining, by the ingress network device and based on the packet, a secure function to secure the packet and a label associated with a label-switched path (LSP) from the ingress network device to an egress network device of the MPLS network that is associated with the destination network device. The method may include encrypting, by the ingress network device and using the secure function, the packet to generate an encrypted packet. The method may include generating, by the ingress network, an MPLS packet comprising, an MPLS header that includes the label and a secure function indicator, a secure MPLS data header that includes information identifying the secure function, and an MPLS payload that includes the encrypted packet. The method may include forwarding, by the ingress network device and based on the label, the MPLS packet.

In some implementations, a non-transitory computer-readable medium storing a set of instructions includes one or more instructions that, when executed by one or more processors of an ingress network device, cause the ingress network device to: receive a packet destined for a destination network device; encrypt, using a secure function, the packet to generate an encrypted packet; generate an MPLS packet comprising: an MPLS header that includes: a label associated with an LSP from the ingress network device to an egress network device of the MPLS network that is associated with the destination network device, and a secure function indicator, a secure MPLS data header that includes information identifying the secure function, and an MPLS payload that includes the encrypted packet; and forward, based on the label, the MPLS packet.

Some implementations described herein relate to a network device. The network device may include one or more memories and one or more processors. The network device may be configured to receive a packet destined for a destination network device. The network device may be configured to encrypt, using a secure function, the packet to generate an encrypted packet. The network device may be configured to generate an MPLS packet comprising an MPLS header that includes a secure function indicator, a secure MPLS data header that includes information identifying the secure function, and an MPLS payload that includes the encrypted packet. The network device may be configured to forward the MPLS packet.

DETAILED DESCRIPTION

Figure 1A:
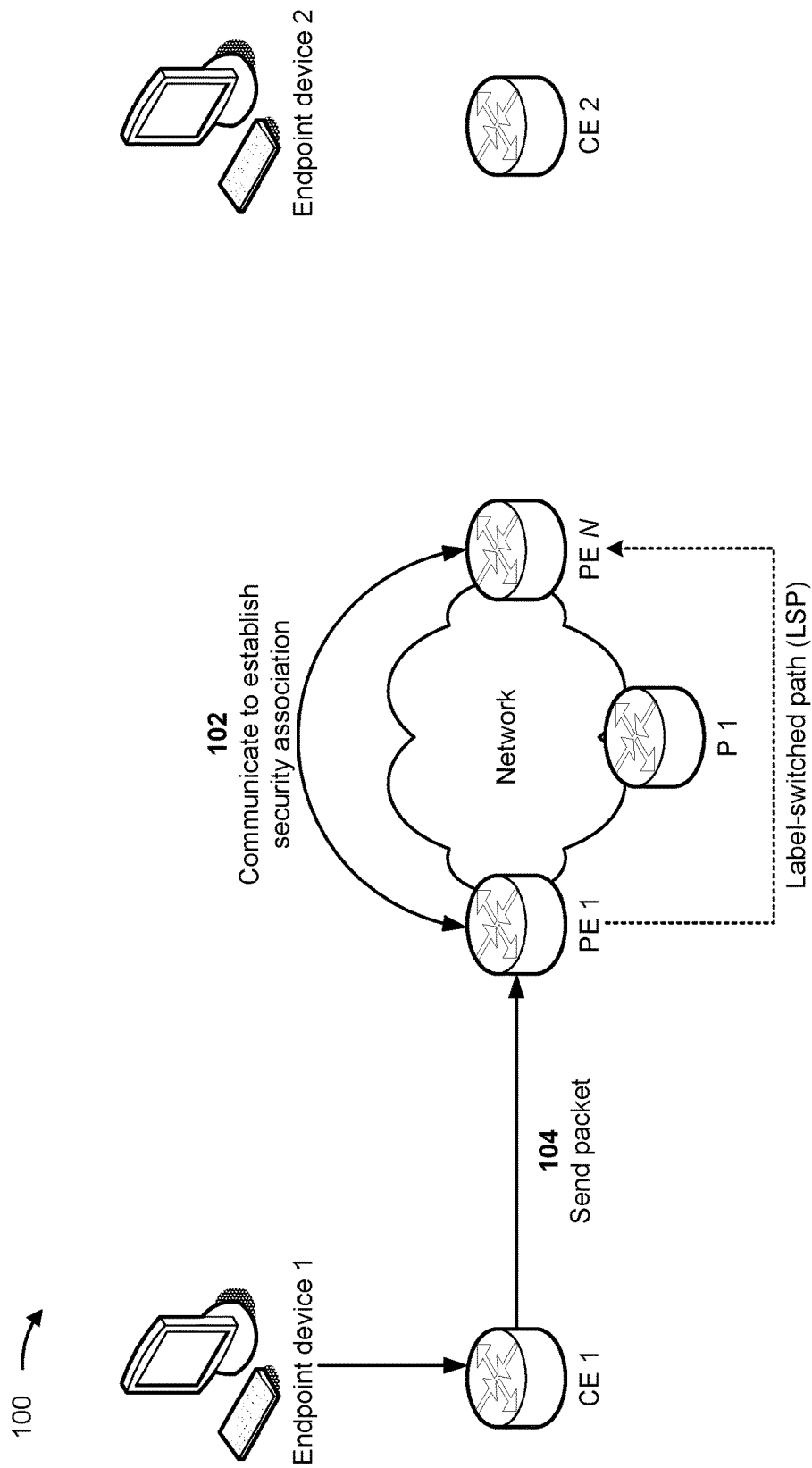
FIGS. 1A-1R are diagrams of an example implementation described herein.

The following detailed description of example implementations refers to the accompanying drawings. The same reference numbers in different drawings may identify the same or similar elements.

A service provider may provide a multiprotocol label switching (MPLS) network for routing data traffic. Often, the data traffic is to be encrypted to ensure security of the data traffic as the data traffic is routed through the MPLS network. In some cases, network devices of the network may use respective security schemes for layer 2 or layer 3 traffic. For example, the network devices may employ media access control security (MACsec) for layer 2 data traffic (e.g., Ethernet data traffic) and Internet protocol security (IPsec) for layer 3 data traffic (e.g., IP data traffic). In other cases, data traffic may be encrypted prior to being routed by the MPLS network (e.g., at customer edge network devices that communicate with the MPLS network) and decrypted after being routed by the MPLS network (e.g., at other customer edge network devices that communicate with the MPLS network). Consequently, network devices of MPLS networks are not able to use a single security scheme for securing data traffic (e.g., regardless of whether the data traffic is layer 2 data traffic or layer 3 data traffic).

This results, in some cases, in data traffic not being secured because computing resources (e.g., processing resources, memory resources, communication resources, and/or power resources, among other examples) are not available to encrypt and decrypt data traffic prior to and after transmitting through the network, and/or because network devices of the MPLS network do not support particular security schemes. Additionally, or alternatively, this results, in some cases, in additional computing devices being included in a transmission path of the data traffic (e.g., prior to and/or after transmitting through the network) to provide encryption and decryption services.

Some implementations described herein provide provider edge network devices of an MPLS network. Endpoint devices, through customer edge devices, may communicate via a label-switched path (LSP) through the network, such as from an ingress network device (e.g., a first particular provider edge network device) to an egress network device (e.g., a second particular provider edge network device). The ingress network device and the egress network device of the LSP communicate with each other to establish a security association (e.g., to facilitate secure transmission of data packets on the LSP through the MPLS network from the ingress network device to the egress network device).

The ingress network device receives a packet (e.g., a layer 2 packet or a layer 3 packet) from an endpoint device via an origination network device (e.g., a customer edge network device). The ingress network device encrypts the packet using a secure function (e.g., an encryption algorithm and a key that is established via the security association between the ingress network device and the egress network device). The ingress network device then generates an MPLS packet that includes an MPLS header (e.g., that includes a label associated with the LSP through the network and a secure function indicator, which indicates that the packet has been encrypted), a secure MPLS data header (e.g., that includes information identifying the secure function that was used to encrypt the packet), and an MPLS payload (e.g., that includes the encrypted packet). The ingress network device forwards the MPLS packet (e.g., based on the label) to another network device (e.g., another particular provider edge network device) of the LSP.

The MPLS packet then may be transmitted (e.g., based on the label included in the MPLS header) via the LSP to the egress network device. The egress network device decrypts the encrypted packet included in the MPLS payload (e.g., using the secure function associated with the security association between the ingress network device and the egress network device) to generate a decrypted packet (e.g., that matches the packet received by the ingress network device). The egress network device forwards, based on destination information included in the decrypted packet, the decrypted packet to a destination network device (e.g., a customer edge network device), which forwards the decrypted pack to an endpoint device.

In this way, some implementations described herein enable secure transmission of data packets through an MPLS network, regardless of whether the data packets are layer 2 packets or layer 3 packets (e.g., some implementations provide a combination of the ease of IPsec with the performance of MACsec for both layer 2 traffic and layer 3 traffic). Accordingly, network devices of the MPLS network (e.g., provider edge network devices) only need to support a single security scheme for securing data traffic through the MPLS network, which reduces a configurational complexity of the network devices. Further, a need for additional computing resources (e.g., processing resources, memory resources, communication resources, and/or power resources, among other examples) to encrypt and decrypt data traffic prior to and after transmitting through the MPLS network is reduced (e.g., because the network devices of the MPLS network support encryption and decryption). Accordingly, additional computing resources are less likely to be included in a transmission path of the data traffic prior to and after transmitting through the MPLS network, which minimizes an expense and complexity associated with otherwise providing and maintaining the additional computing resources.

Further, data packets that are to be secure (e.g., encrypted) and other data packets that are to not be secured (e.g., not encrypted) may be transmitted through the MPLS network via a same LSP through the network (e.g., from the ingress network device to the egress network device). In this way, additional network devices do not need to be added to the MPLS network and additional LSPs do not need to be established and maintained.

Figure 1B:
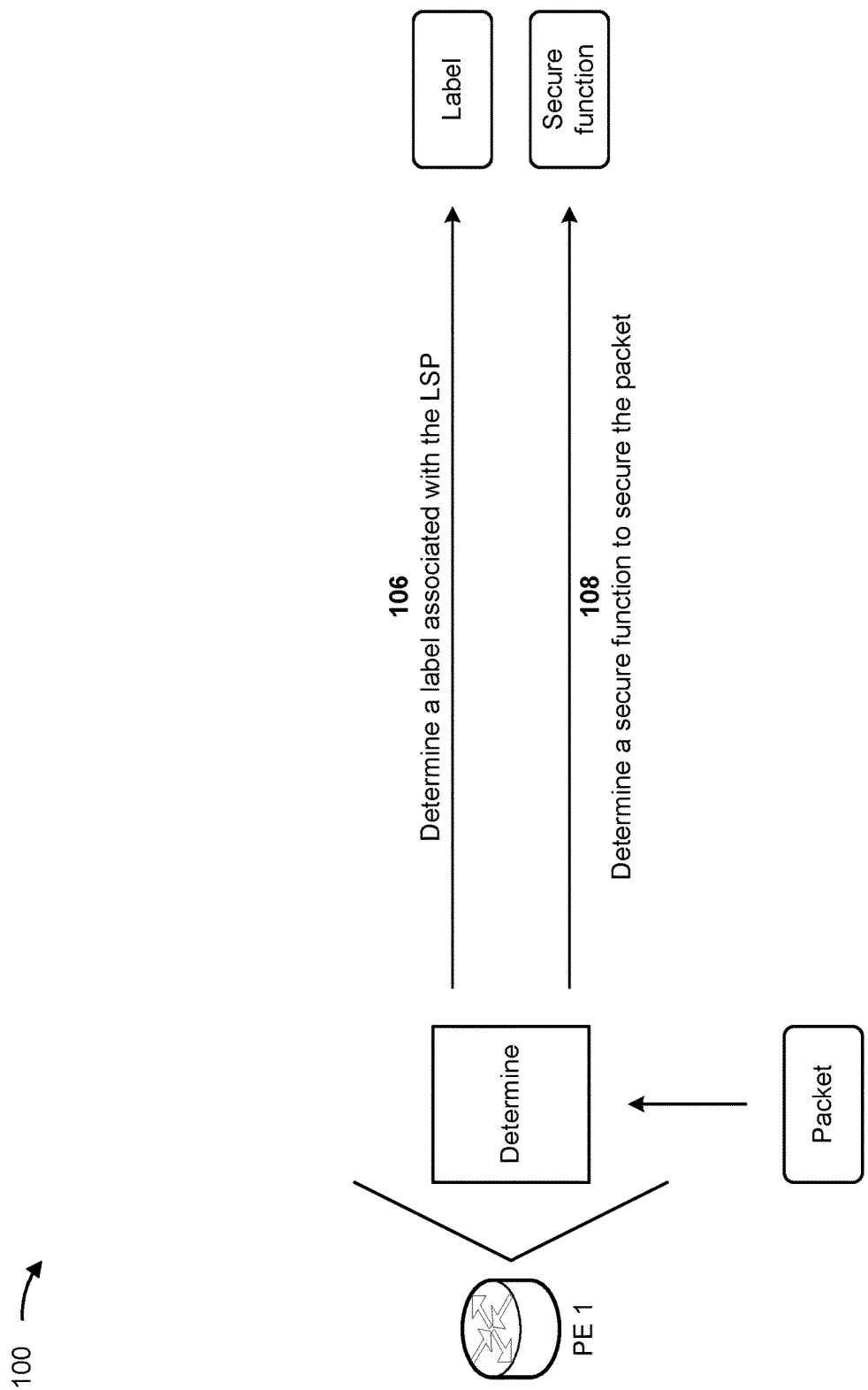
Figure 1D:
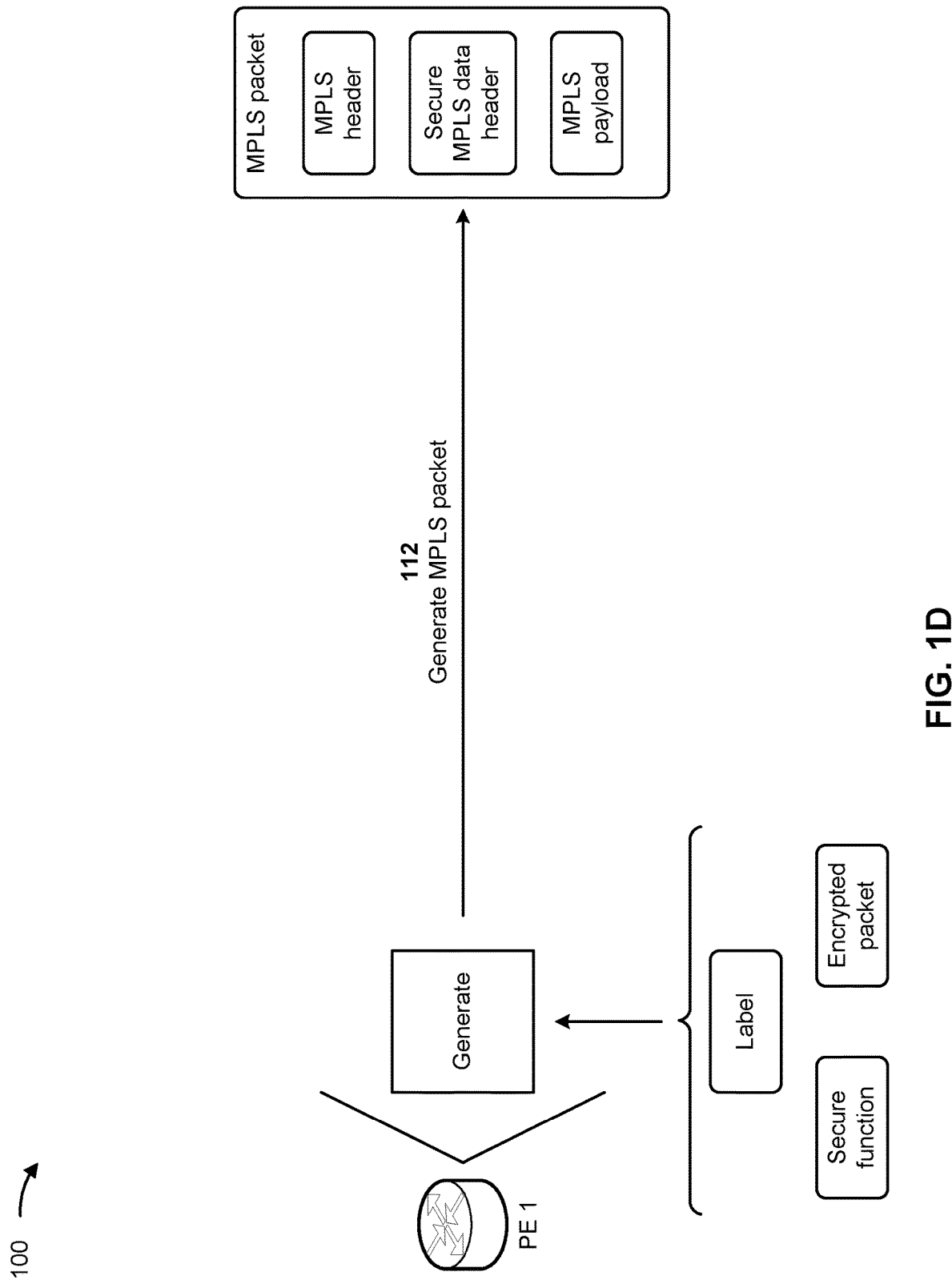
Figure 1G:
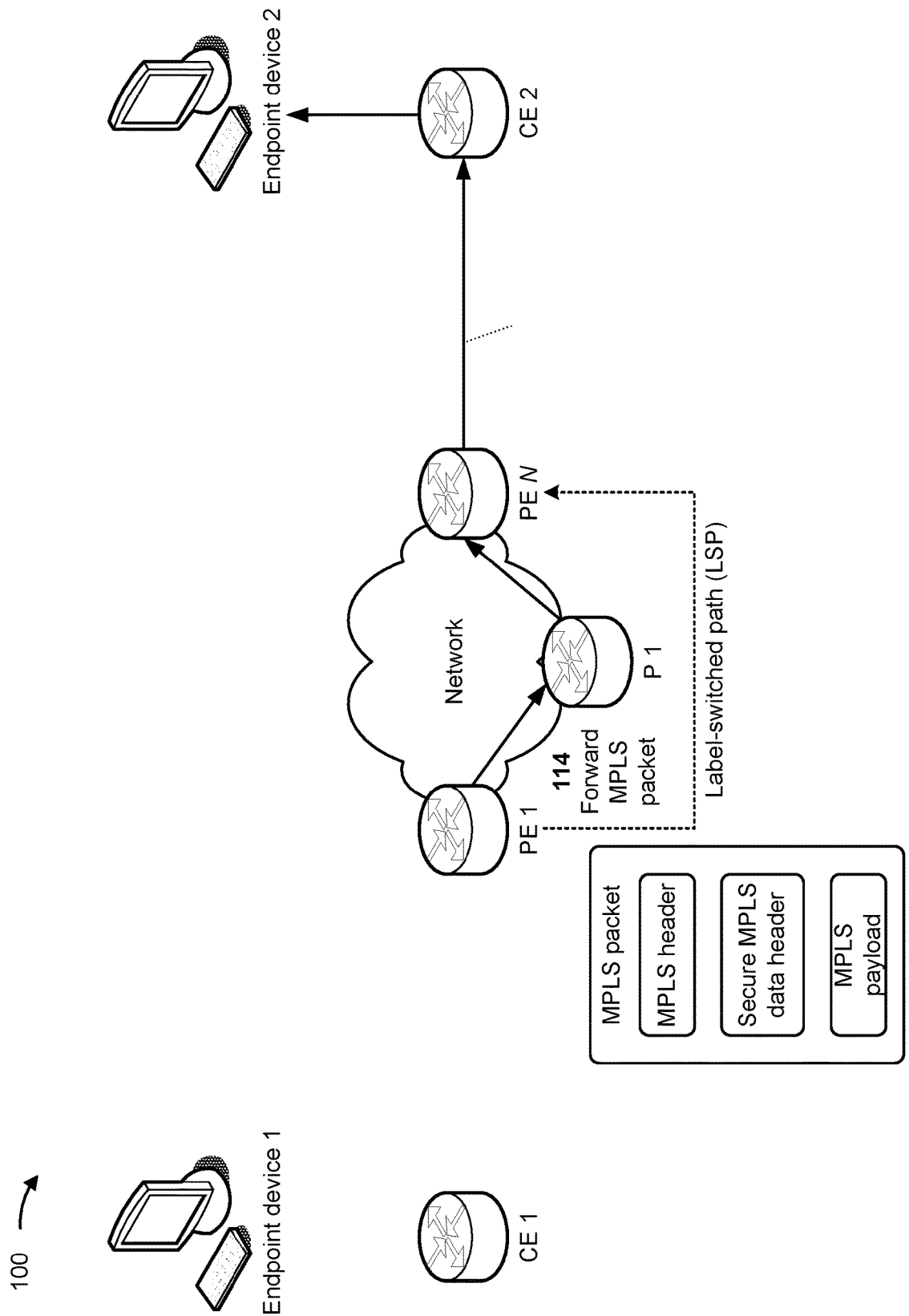
Figure 1H:
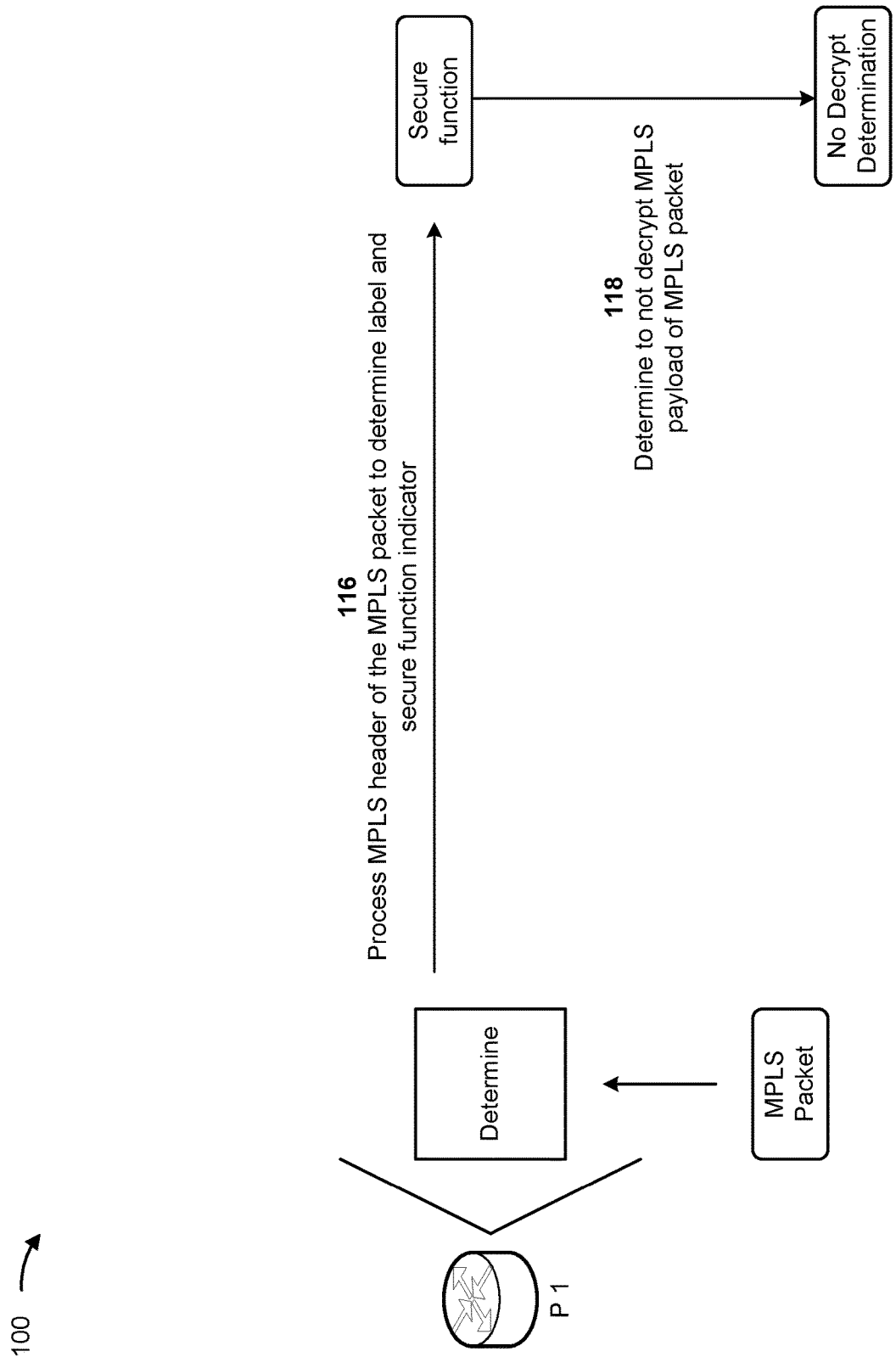
Figure 1I:
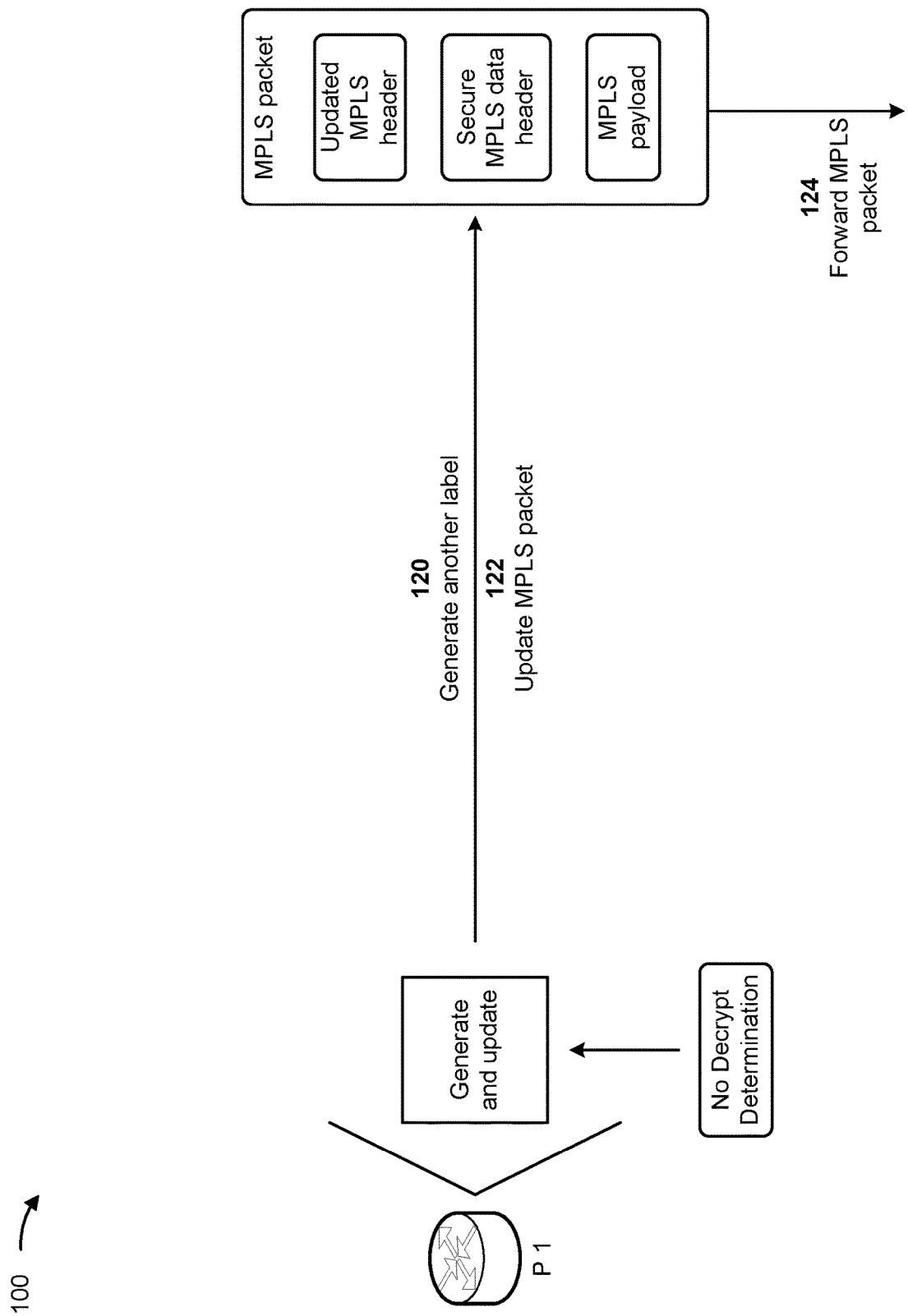
Figure 1J:
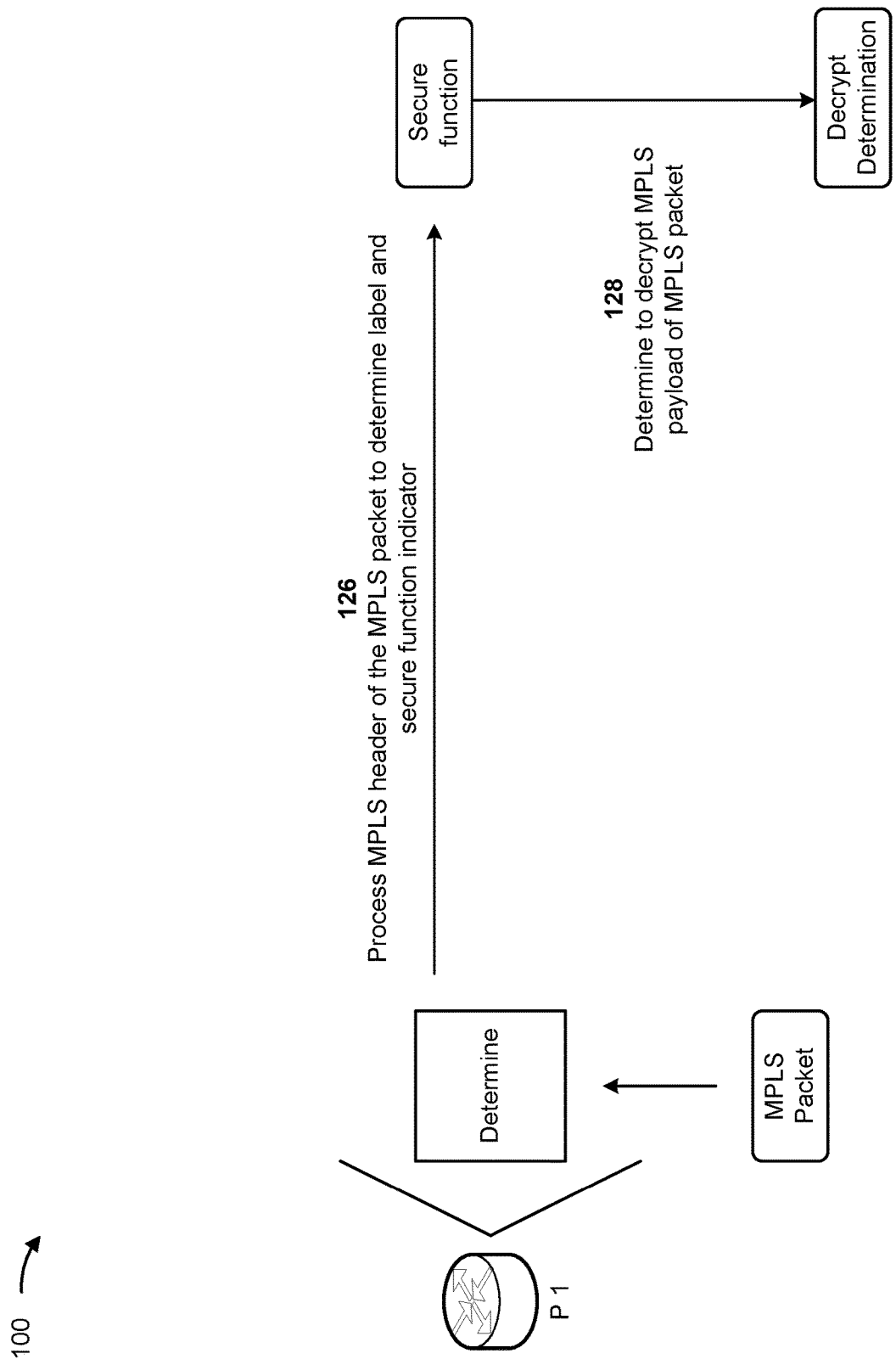
Figure 1K:
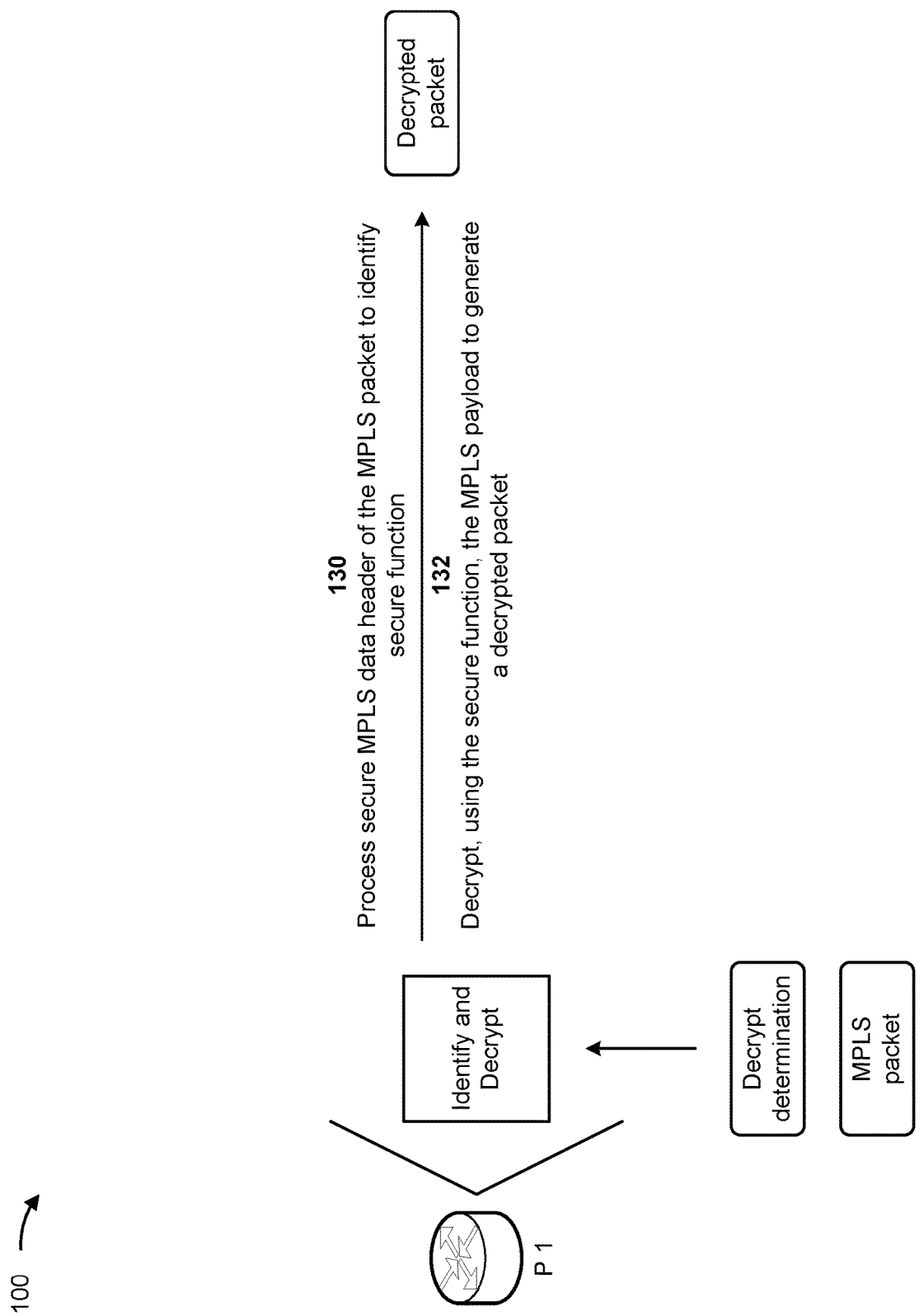
Figure 1L:
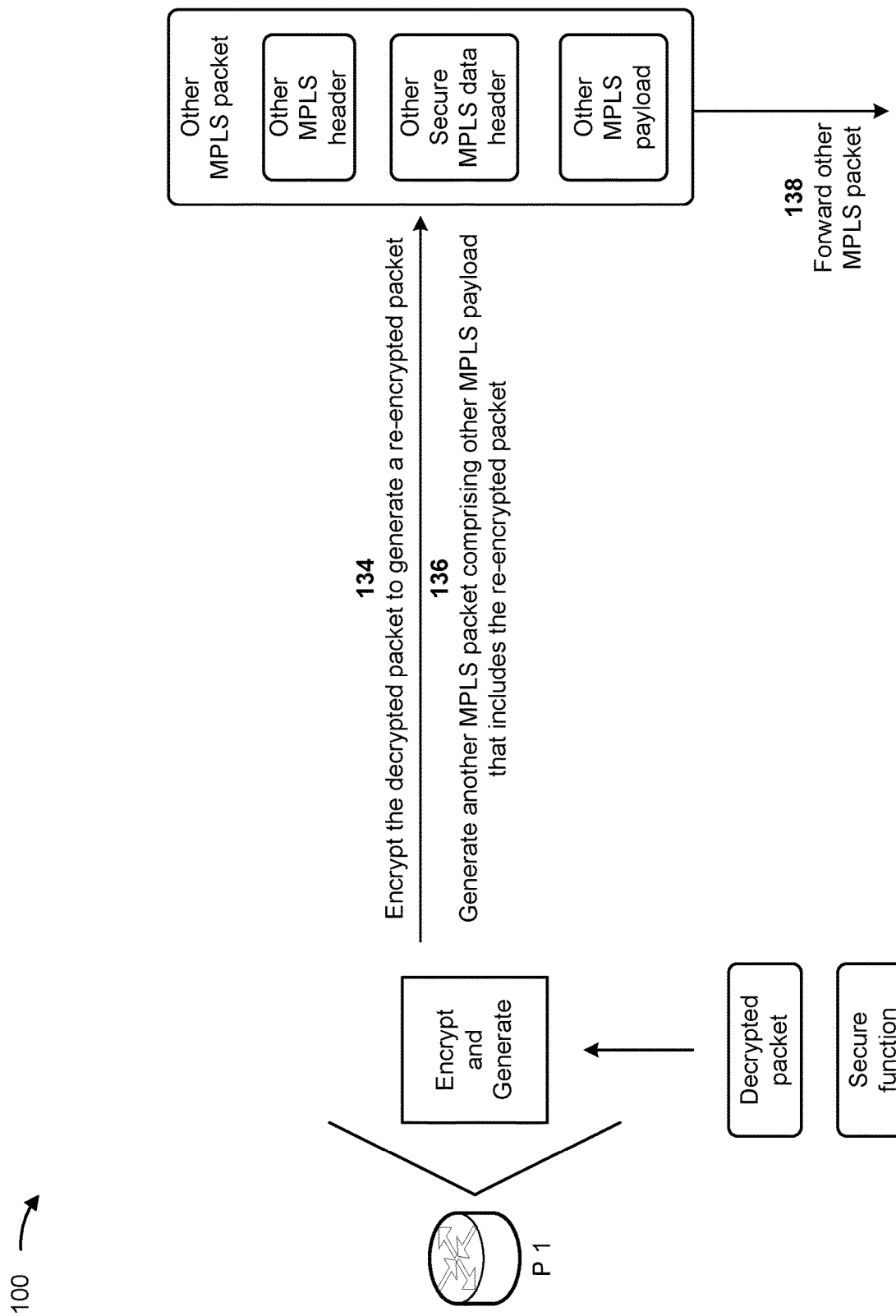
Figure 1M:
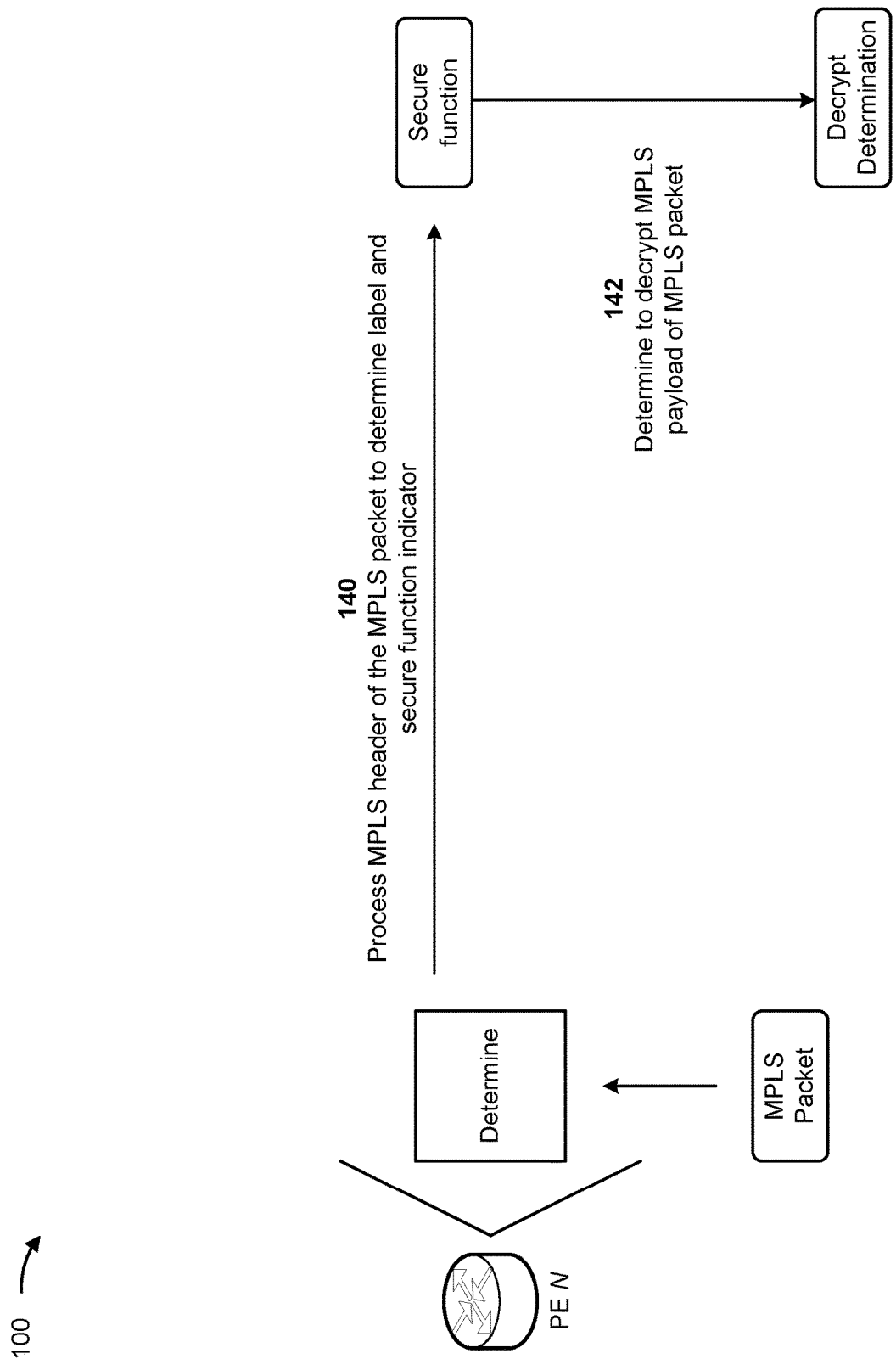
Figure 1N:
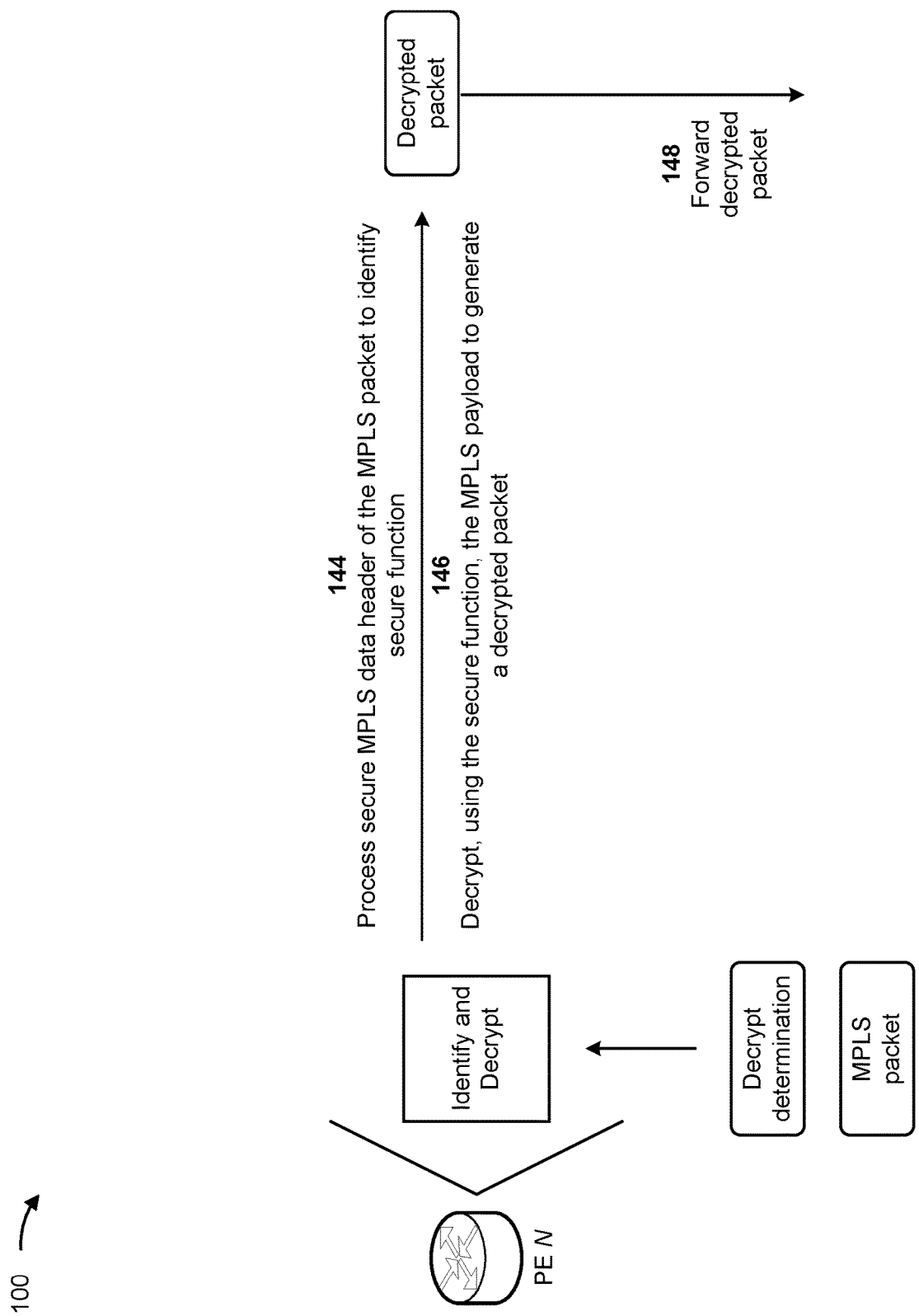
Figure 1O:
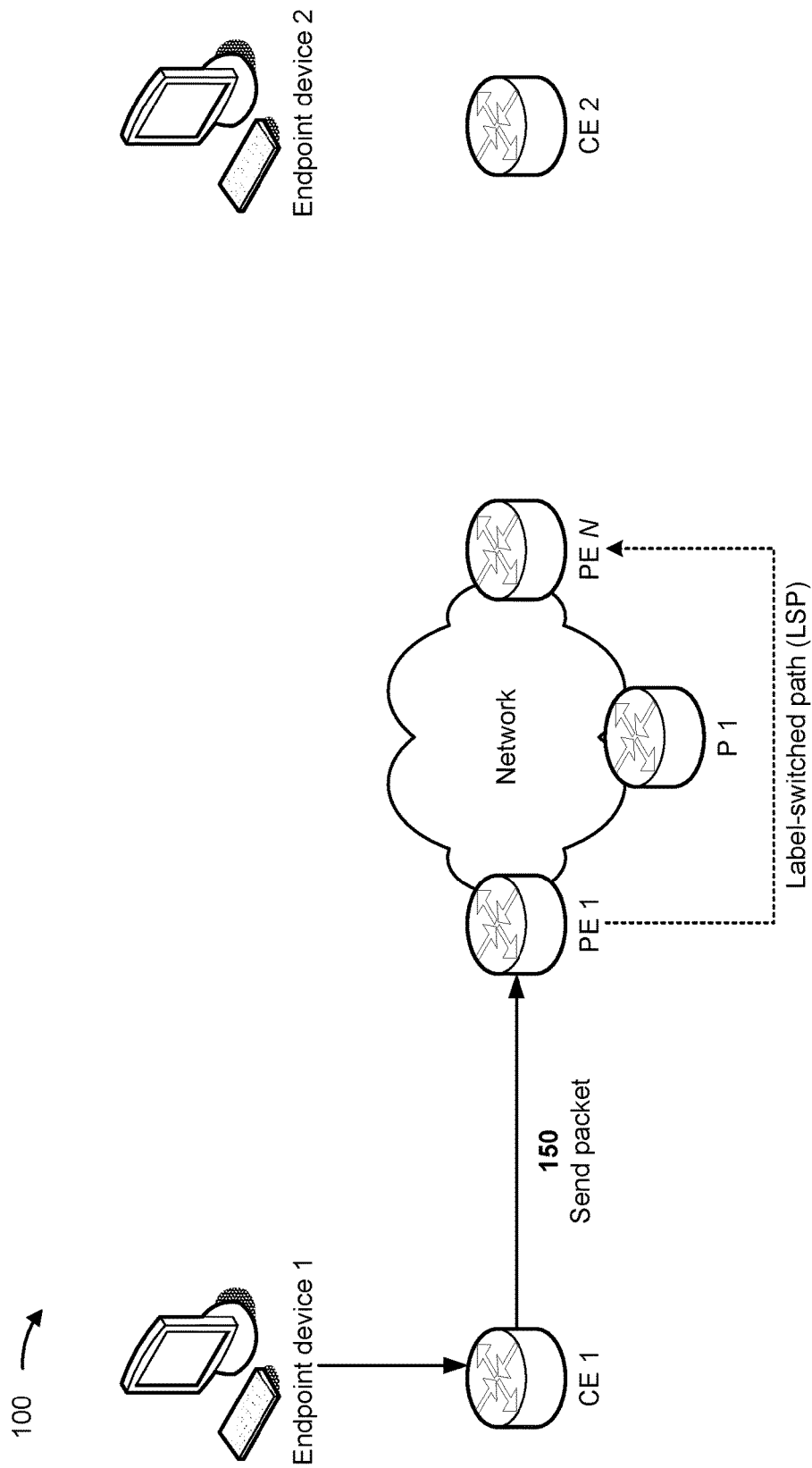
Figure 1P:
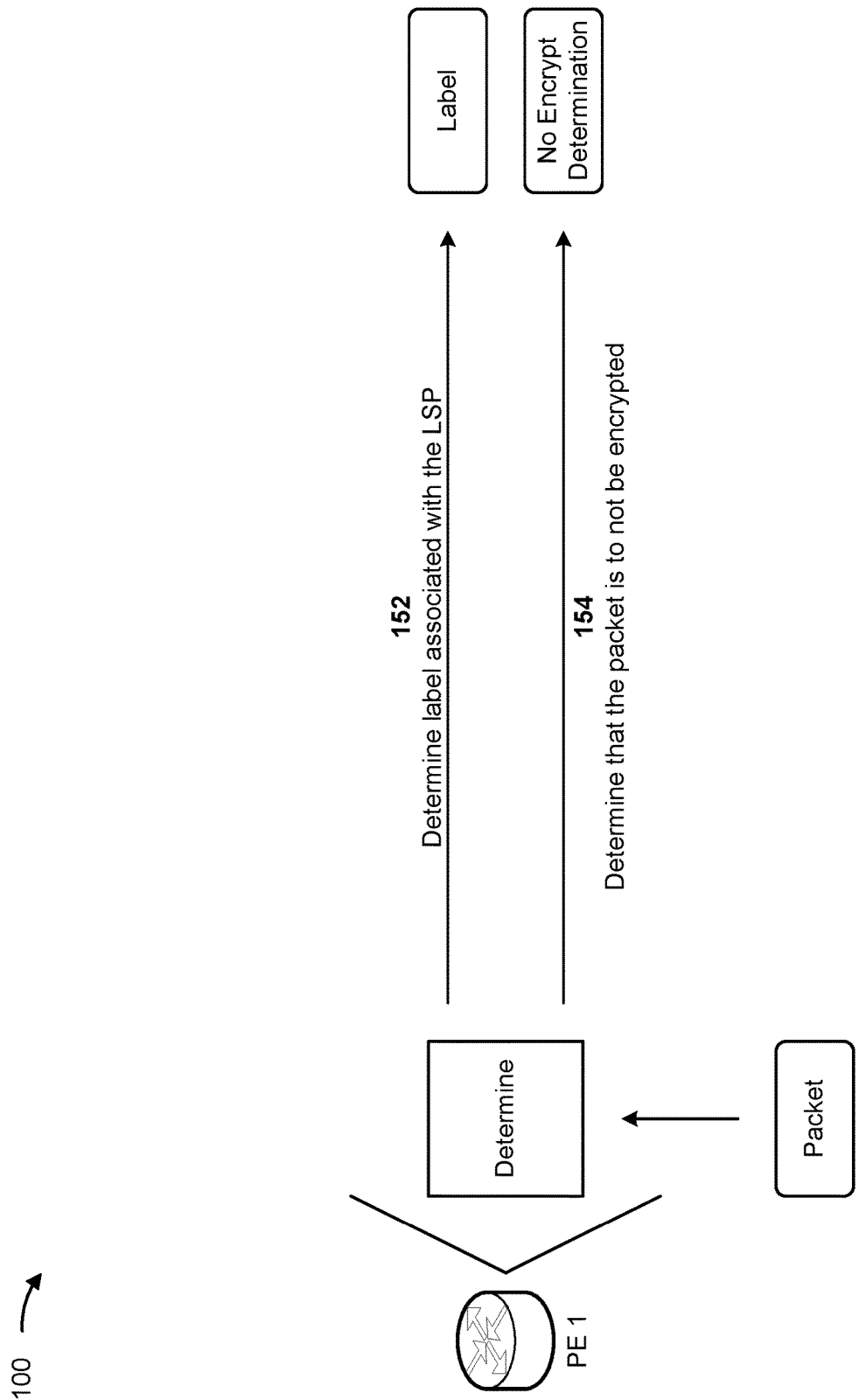
Figure 1Q:
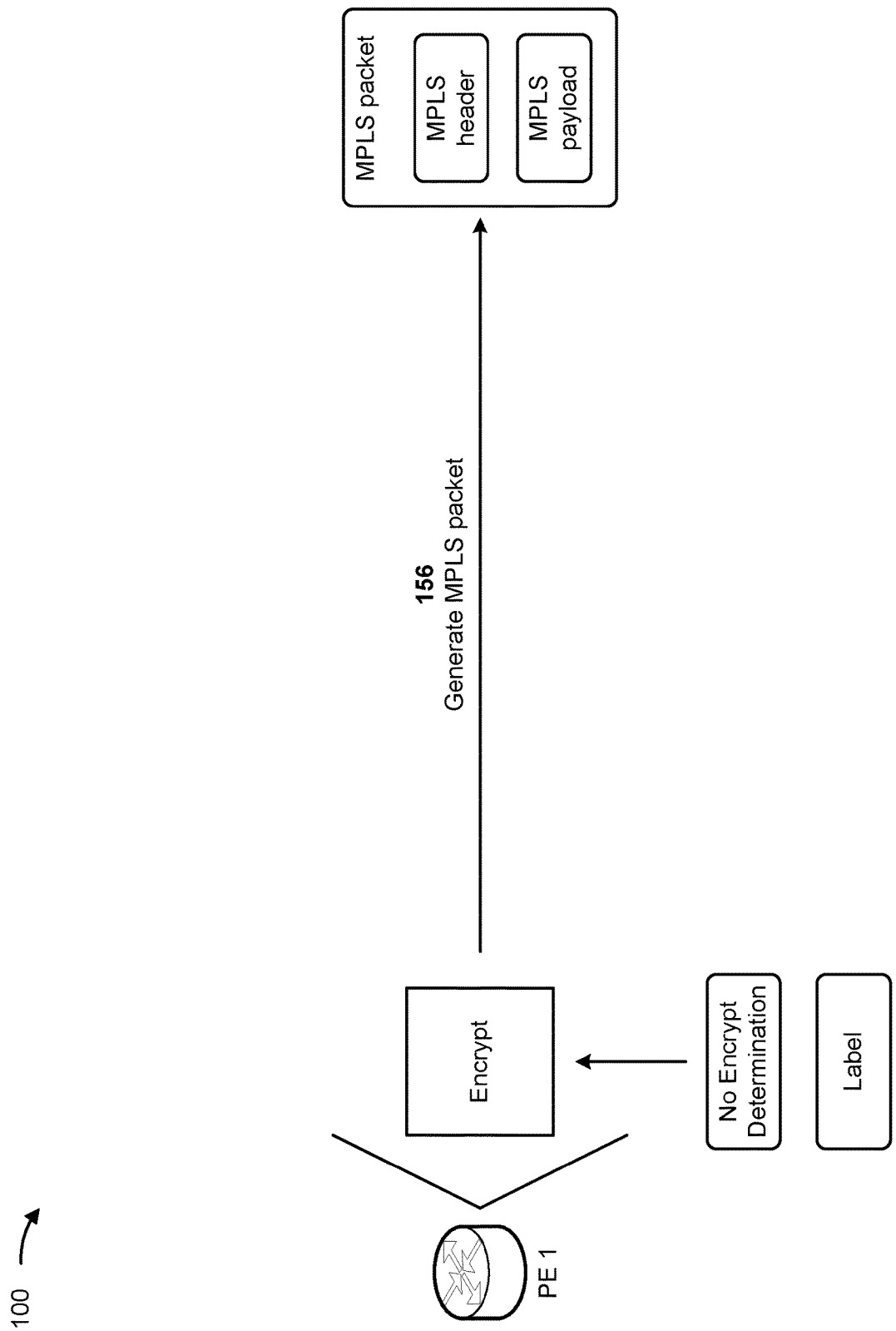
Figure 1R:
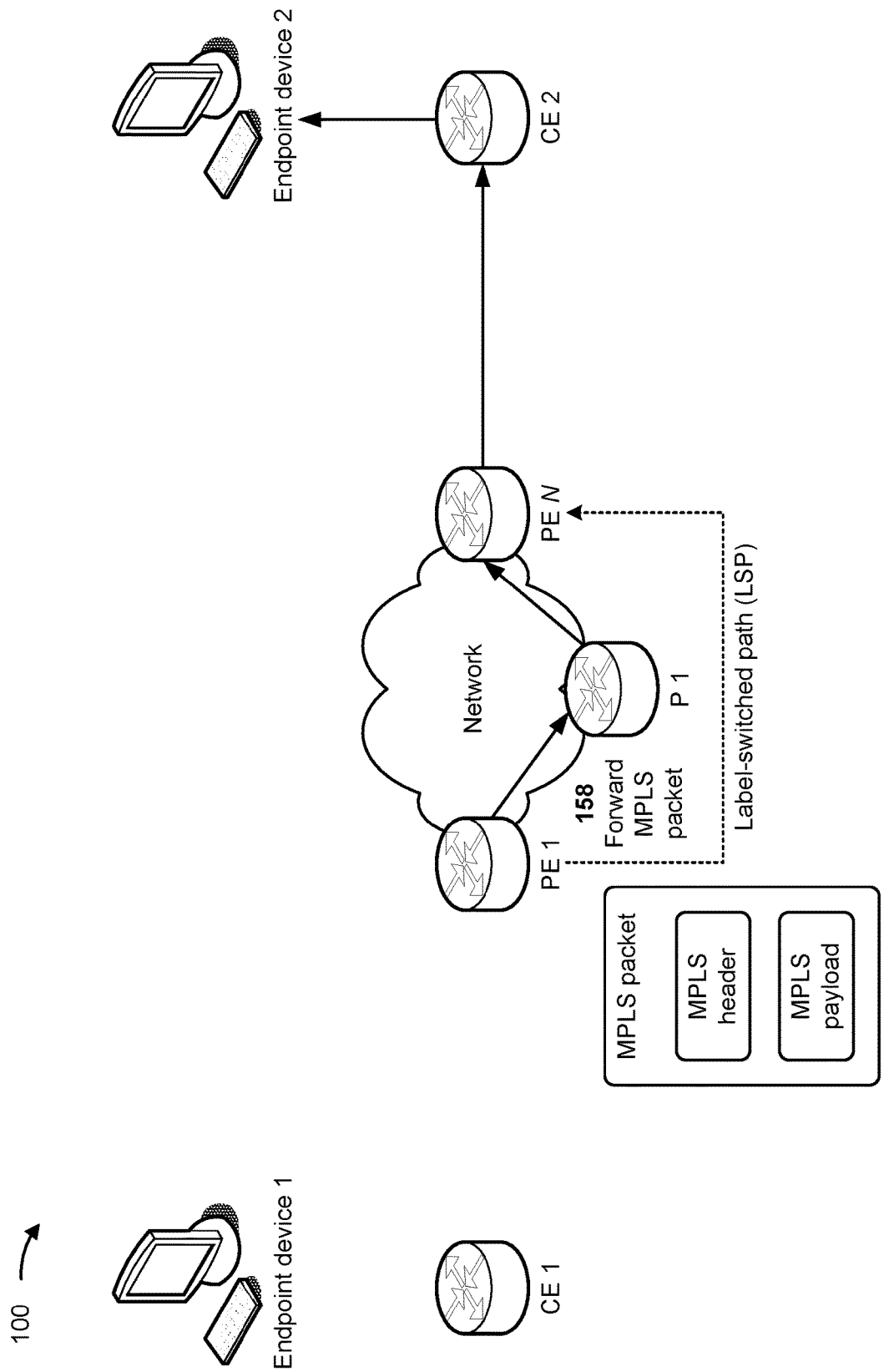

FIGS. 1A-1R are diagrams of one or more example implementations 100 described herein. Example implementation(s) 100 may include a plurality of endpoint devices (shown as endpoint devices 1 and 2), a plurality of customer edge (CE) network devices (shown as CEs 1 and 2), a plurality of provider edge (PE) network devices (shown as PEs 1 through N, where N≥2), and/or one or more provider (P) network devices (shown as P 1), which are described in more detail below in connection with FIGS. 2-4. The plurality of PEs may provide the plurality of CEs access to a network, such as a label-switched network (e.g., an MPLS network).

In some implementations, at least some PE network devices, of the plurality of PE network devices, may be associated with a label-switched path (LSP) through the network. For example, as shown in FIG. 1A, PE 1 may be associated with CE 1 and endpoint device 1 (e.g., PE 1 may be an ingress network device to the network for CE 1 and endpoint device 1) and PE N may be associated with CE 2 and endpoint device 2 (e.g., PE N may be an egress network device from the network for CE 2 and endpoint device 2). In order for endpoint 1 to communicate with endpoint device 2, packets are to communicate from endpoint 1, to CE 1, to PE 1, through the network to PE N, to CE 2, and to endpoint device 2 (and vice versa). Accordingly, the LSP may be a path through the network from PE 1 (e.g., as the ingress network device), via the one or more P network devices (e.g., P 1), to PE N (e.g., as the egress network device), and vice versa.

As shown in FIG. 1A, and by reference number 102, PE 1 and PE N (e.g., as the ingress network device and the egress network device of the LSP through the network) may communicate with each other to establish a security association between PE 1 and PE N. In some implementations, PE 1 and PE N may exchange Internet key exchange (IKE) messages to establish the security association. For example, PE 1 and PE N may exchange IKE messages using a particular protocol (e.g., that has been extended to carry IKE messages), such as a resource reservation protocol (RSVP), an interior gateway protocol (IGP) (e.g., an intermediate system to intermediate system (ISIS) protocol or an open shortest path first (OSPF) protocol), a multiprotocol border gateway protocol (MP-BGP), a transport protocol (e.g., a path computation element communication protocol (PCEP)), and/or an application programming interface (API) communication protocol (e.g., a remote procedure call (gRPC) protocol). The security association may include shared secret information, such as security keys and/or a security function (described further herein), that can be used to secure communications between the PE 1 and PE N (e.g., by encrypting and decrypting packets using at least one secure function).

As further shown in FIG. 1A, and by reference number 104, endpoint device 1 may send, to CE 1, a packet that is destined for endpoint device 2. The packet may be a layer 2 packet, such as an Ethernet packet, or a layer 3 packet, such as an Internet protocol (IP) packet. CE 1 may provide the packet to PE 1 (e.g., because PE 1 is the ingress network device to the network for CE 1) to cause the packet to be routed (e.g., via the LSP through the network) to a destination network device (e.g., CE 2) associated with endpoint device 2. Accordingly, PE 1 may receive the packet that is destined for CE 2.

As shown in FIG. 1B, and by reference number 106, PE 1 may determine a label associated with the LSP through the network from PE 1 (e.g., as the ingress network device) to PE N (e.g., as the egress network device), which is associated with CE 2 (e.g., the destination network device). For example, PE 1 may process the packet to identify CE 2 as the destination network device of the packet. PE 1 may identify and search, based on identifying CE 2 as the destination network device, a data structure (e.g., a database, an electronic file, or another data structure that is included in PE 1 and/or accessible to PE 1) for an entry of the data structure that is associated with CE 2. The entry may indicate that PE N is associated with CE 2 (e.g., as the egress network device associated with CE 2) and may indicate a label associated with the LSP through the network from PE 1 (e.g., as the ingress network device) to PE N (e.g., as the egress network device). The label may indicate a next-hop (e.g., P 1, as shown in FIG. 1A), from PE 1, of the LSP. Additionally, or alternatively, as shown by reference number 108, PE 1 may determine a secure function to secure the packet (e.g., a cryptographic function for encrypting and/or decrypting the packet). For example, PE 1 may identify, based on the shared secret information associated with the security association established between PE 1 and PE N, the secure function.

As shown in FIG. 1C, and by reference number 110, PE 1 may encrypt the packet (e.g., that was provided to PE 1 by CE 1). For example, PE 1 may use the secure function (e.g., that was determined by PE 1) to encrypt the packet and thereby generate an encrypted packet.

As shown in FIG. 1D, and by reference number 112, PE 1 may generate a label-switched packet, such as an MPLS packet. For example, PE 1 may generate an MPLS packet that includes an MPLS header, a secure MPLS data header, and an MPLS payload. The MPLS header may include the label (e.g., that is associated with the LSP through the network from PE 1 to PE N) and a secure function indicator. The secure function indicator may indicate that the MPLS payload includes the encrypted packet (as further described herein) and/or that the secure function (e.g., that PE 1 used to generate the encrypted packet) provides hop-to-hop security (e.g., at least one "hop," or P network device, of the network may use the secure function to decrypt and/or encrypt the MPLS payload) or end-to-end security (e.g., only PE N, as the egress network device, may use the secure function to decrypt the MPLS payload). The secure MPLS data header may include information identifying the secure function, which may include a security parameter index (SPI) value that indicates the security association between PE 1 and PE N and/or the shared secret information associated with the security association (e.g., that identifies the secure function); a sequence number value that indicates a monotonically increasing counter value to provide anti-replay protection for the MPLS packet; and/or an integrity check value (ICV) associated with the MPLS packet to facilitate verification of an integrity of the MPLS packet; among other examples. The MPLS payload may include the encrypted packet (e.g., that PE 1 encrypted using the secure function).

FIG. 1E shows an example MPLS header of the MPLS packet. As shown in FIG. 1E, the example MPLS header may be an MPLS indicators and ancillary data (MIAD) header (e.g., a particular type-length-value (TLV) that includes a "Transport Label" field that includes the label (e.g., that is associated with the LSP through the network from PE 1 to PE N), a "traffic class (TC)" that identifies a length of the MPLS header," a "time to live (TTL)" field associated with the MPLS header, a "Base Special Purpose Label" that indicates that the ancillary data can include the secure MPLS data header, a "y" function indicator field that includes the secure function indicator, one or more "f" function indicator fields that indicate other network action indicators, an "x" field extension bit, and an "S" bottom of stack value that (e.g., when S=1) indicates that ancillary data (e.g., a secure MPLS data header) is included after the MPLS header (e.g., as an ancillary data sub-type-length-value (sub-TLV)). In some implementations, the MPLS header may include a field to indicate an end-to-end security action or function, and/or a field to indicate a hop-to-hop security action or function.

FIG. 1F shows an example secure MPLS data header (e.g., as an ancillary data sub-type-length-value (sub-TLV)) of the MPLS packet. As shown in FIG. 1F, the example secure MPLS data header may include a "SubType" field that indicates that the header is a secure MPLS data header; a "Security Parameter Index (SPI)" field that includes the SPI value that indicates the security association between PE 1 and PE N and/or the shared secret information associated with the security association, which may identify the secure function; a "Sequence Number" field that includes the sequence number value that provides anti-replay protection; and an "Authentication Data" field that includes the ICV associated with the MPLS packet to facilitate verification of the integrity of the MPLS packet.

As shown in FIG. 1G, and by reference number 114, PE 1 may forward the MPLS packet (e.g., that includes the MPLS header, the secure MPLS data header, and the MPLS payload). For example, PE 1 may forward the MPLS packet to PE N via the one or more P network devices associated with the LSP through the network, such as via P 1. PE N may forward the MPLS packet to CE 2, which may forward the MPLS packet to endpoint device 2. Processing steps performed by P 1 and PE N to facilitate forwarding of the MPLS packet are further described herein in relation to FIGS. 1H-1N.

FIGS. 1H-1I show one or more processing steps performed by P 1 (and/or any other P network device of the LSP through the network from PE 1 to PEN that is not an ingress network device and not an egress network device of the LSP) in relation to the MPLS packet (e.g., that was forwarded to P 1 by PE 1). As shown in FIG. 1H, and by reference number 116, P 1 may process (e.g., read or parse) the MPLS header of the MPLS packet to determine the label (e.g., that is associated with the LSP through the network from PE 1 to PE N) and the secure function indicator, which may indicate that the secure function provides end-to-end security (not hop-to-hop security). Accordingly, as shown by reference number 118, P 1 may determine (e.g., based on the secure function indicator indicating that the secure function provides end-to-end security) that P 1 is to not decrypt the MPLS payload of the MPLS packet (e.g., because P 1 is not the egress network device associated with the LSP).

As shown in FIG. 1I, and by reference number 120, P 1 may generate another label associated with the LSP through the network from PE 1 to PEN (e.g., based on P 1 determining that P 1 is to not decrypt the MPLS payload of the MPLS packet). To determine the other label, P 1 may identify and search, based on the label (e.g., that was determined by P 1 by processing the MPLS header of the MPLS packet), a data structure (e.g., a database, an electronic file, or another data structure that is included in P 1 and/or accessible to P 1) for an entry of the data structure that is associated with the LSP through the network from PE 1 to PE N. The entry may indicate that the other label is associated with the LSP through the network from PE 1 to PE N. The other label may indicate a next-hop (e.g., PE N, as shown in FIG. 1G), from P 1, of the LSP.

As shown by reference number 122, P 1 may update the MPLS packet. For example, P 1 may update the MPLS header of the MPLS packet to include the other label, and not the label originally included in the MPLS header. That is, P 1 may replace the label of the MPLS header with the other label (e.g., that was determined by P 1). This is sometimes referred to as a swap operation. As shown by reference number 124, P 1 may forward the MPLS packet (e.g., that includes the updated MPLS header, the secure MPLS data header, and the MPLS payload). For example, P 1 may forward the MPLS packet to PE N (e.g., as shown in FIG. 1G). In some implementations, P1 may not update the MPLS packet (e.g., may not update the MPLS header of the MPLS packet, such that the MPLS header includes the label originally included in the MPLS header) before forwarding the MPLS packet.

FIGS. 1J-1L show one or more alternative processing steps performed by P 1 (and/or any other P network device of the LSP through the network from PE 1 to PE N that is not an ingress network device and not an egress network device of the LSP) in relation to the MPLS packet (e.g., that was forwarded to P 1 by PE 1). As shown in FIG. 1J, and by reference number 126, P 1 may process (e.g., read or parse) the MPLS header of the MPLS packet to determine the label (e.g., that is associated with the LSP through the network from PE 1 to PE N) and the secure function indicator, which may indicate that the secure function provides hop-to-hop security (not end-to-end security). Accordingly, as shown by reference number 128, P 1 may determine (e.g., based on the secure function indicator indicating that the secure function provides hop-to-hop security) that P 1 is to decrypt the MPLS payload of the MPLS packet (e.g., because P 1 is a hop along the LSP through the network from PE 1 to PE N).

As shown in FIG. 1K, and by reference number 130, P 1 may process (e.g., read or parse) the secure MPLS data header of the MPLS packet to identify the secure function (e.g., that was used by PE 1 to encrypt the packet included in the MPLS payload of the MPLS packet). For example, P 1 may identify the SPI value included in the information identifying the secure function of the secure MPLS data header and may thereby determine (e.g., based on performing a lookup, based on the SPI value, in a data structure that is included in P 1 and/or is accessible to P 1) the secure function. As shown by reference number 132, P 1 may decrypt the MPLS payload of the MPLS packet. For example, P 1 may use the secure function to decrypt the MPLS payload to generate a decrypted packet. The decrypted packet may be a decrypted version of the encrypted packet, which may cause the decrypted packet to match (e.g., be the same as, or similar to) the original packet sent to PE 1 by endpoint device 1 via CE 1.

As shown in FIG. 1L, and by reference number 134, P 1 may encrypt (e.g., re-encrypt) the decrypted packet. For example, P 1 may encrypt, using the secure function, the decrypted packet to generate a re-encrypted packet. As shown by reference number 136, P 1 may generate another MPLS packet. For example, P 1 may generate another MPLS packet that includes another MPLS header, another secure MPLS data header, and another MPLS payload. The other MPLS header may include another label associated with the LSP through the network from PE 1 to PE N (e.g., that is determined in a similar manner as that described herein in relation to FIG. 1I and reference number 120) and the secure function indicator (e.g., that indicates that the secure function provides hop-to-hop security). The other label may indicate a next-hop (e.g., PE N, as shown in FIG. 1G), from P 1, of the LSP. The other secure MPLS data header may include the information identifying the secure function, and the other MPLS payload may include the re-encrypted packet. As shown by reference number 138, P 1 may forward the MPLS packet (e.g., that includes the other MPLS header, the other secure MPLS data header, and the other MPLS payload). For example, P 1 may forward the other MPLS packet to PE N (e.g., as shown in FIG. 1G).

FIGS. 1M-1N show one or more processing steps performed by PE N (e.g., as an egress network device of the LSP through the network from PE 1 to PE N) in relation to an MPLS packet received by PE N (e.g., the updated MPLS packet that was forwarded to PEN by P 1, as described herein in relation to FIG. 1I, or the other MPLS packet that was generated and forwarded to PE N by P 1, as described herein in relation to FIG. 1L). The MPLS packet may include an MPLS header (e.g., that includes a label associated with the LSP from PE 1 to PE N and a secure function indicator that indicates that a secure function provides hop-to-hop security or end-to-end security), a secure MPLS data header (e.g., that includes information identifying the secure function), and an MPLS payload (e.g., that includes an encrypted packet that was encrypted using the secure function).

As shown in FIG. 1M, and by reference number 140, PE N may process (e.g., read or parse) the MPLS header of the MPLS packet to determine the label (e.g., that is associated with the LSP from PE 1 to PE N) and the secure function indicator, which may indicate that the secure function provides hop-to-hop security or end-to-end security. Accordingly, as shown by reference number 142, PE N may determine (e.g., based on the label and/or the secure function indicator) that PE N is to decrypt the MPLS payload of the MPLS packet. For example, PE N may determine, based on the label, that PE N is the egress network device of the LSP through the network from PE 1 to PE N, and may thereby determine (e.g., based on the secure function indicator indicating that the secure function provides end-to-end security) that PE N is to decrypt the MPLS payload of the MPLS packet.

As shown in FIG. 1N, and by reference number 144, PE N may process (e.g., read or parse) the secure MPLS data header of the MPLS packet to identify the secure function (e.g., that was used to encrypt the packet included in the MPLS payload of the MPLS packet). Accordingly, as shown by reference number 146, PE N may decrypt the MPLS payload of the MPLS packet. For example, PE N may use the secure function to decrypt the MPLS payload to generate a decrypted packet. The decrypted packet may be a decrypted version of the encrypted packet, which may cause the decrypted packet to match (e.g., be the same as, or similar to) the original packet sent to PE 1 by endpoint device 1 via CE 1. As shown by reference number 148, PE N may forward the decrypted packet. For example, PE N may forward the decrypted packet (e.g., based on destination information included in the decrypted packet) to CE 2 (e.g., as shown in FIG. 1G, such as when the destination information indicates CE 2 as a destination network device for the decrypted packet). Accordingly, CE 2 may further forward the decrypted packet to endpoint device 2 (e.g., as further shown in FIG. 1G).

FIGS. 1O-1R show one or more processing steps performed by PE 1 in relation to receiving another packet. As shown in FIG. 1O, and by reference number 150, endpoint device 1 may send, to CE 1, a packet that is destined for endpoint device 2. The packet may be a layer 2 packet or a layer 3 packet. CE 1 may provide the packet to PE 1 (e.g., because PE 1 is the ingress network device to the network for CE 1) to cause the packet to be routed (e.g., via LSP through the network from PE 1 to PE N) to a destination network device (e.g., CE 2) associated with endpoint device 2. Accordingly, PE 1 may receive the packet that is destined for CE 2.

As shown in FIG. 1P, and by reference number 152, PE 1 may determine a label associated with the LSP through the network from PE 1 to PE N (e.g., in a similar manner as that described herein in relation to FIG. 1B). The label may indicate a next-hop (e.g., P 1, as shown in FIG. 1O), from PE 1, of the LSP. As shown by reference number 154, PE 1 may determine that the packet is to not be encrypted. For example, PE 1 may be configured to encrypt packets of a particular type and/or of a particular layer, and may process (e.g., read and/or parse) the packet to determine that the packet is not of the particular type and/or the particular layer. Accordingly, PE 1 may determine that the packet is to not be encrypted.

As shown in FIG. 1Q, and by reference number 156, PE 1 may generate a label-switched packet, such as an MPLS packet. For example, PE 1 may generate an MPLS packet that includes an MPLS header and an MPLS payload. The MPLS header may include the label (e.g., that is associated with the LSP through the network from PE 1 to PEN). Additionally, the MPLS header may not include a secure function indicator (e.g., because PE 1 determined that the packet is to not be encrypted). The MPLS payload may include the packet (e.g., that has not been encrypted).

As shown in FIG. 1R, and by reference number 158, PE 1 may forward the MPLS packet (e.g., that includes the MPLS header and the MPLS payload). For example, PE 1 may forward the MPLS packet to PE N via one or more other PE network devices associated with the LSP through the network, such as via P 1. PE N then may identify the packet that is included in the MPLS packet (e.g., in the MPLS payload of the MPLS packet), and may forward the packet (e.g., based on destination information included in the packet) to CE 2, such as when the destination information indicates CE 2 as a destination network device for the packet. Accordingly, CE 2 may further forward the packet to endpoint device 2. In this way, a first packet that is to be secured (e.g., encrypted and encapsulated in a first MPLS packet) and a second packet that is to not be secured (e.g., encapsulated in a second MPLS packet without encryption) may traverse the same LSP through the network (e.g., from PE 1 to PEN).

As indicated above, FIGS. 1A-1R are provided as an example. Other examples may differ from what is described with regard to FIGS. 1A-1R. The number and arrangement of devices shown in FIGS. 1A-1R are provided as an example. In practice, there may be additional devices, fewer devices, different devices, or differently arranged devices than those shown in FIGS. 1A-1R. Furthermore, two or more devices shown in FIGS. 1A-1R may be implemented within a single device, or a single device shown in FIGS. 1A-1R may be implemented as multiple, distributed devices. Additionally, or alternatively, a set of devices (e.g., one or more devices) shown in FIGS. 1A-1R may perform one or more functions described as being performed by another set of devices shown in FIGS. 1A-1R.

Figure 2:
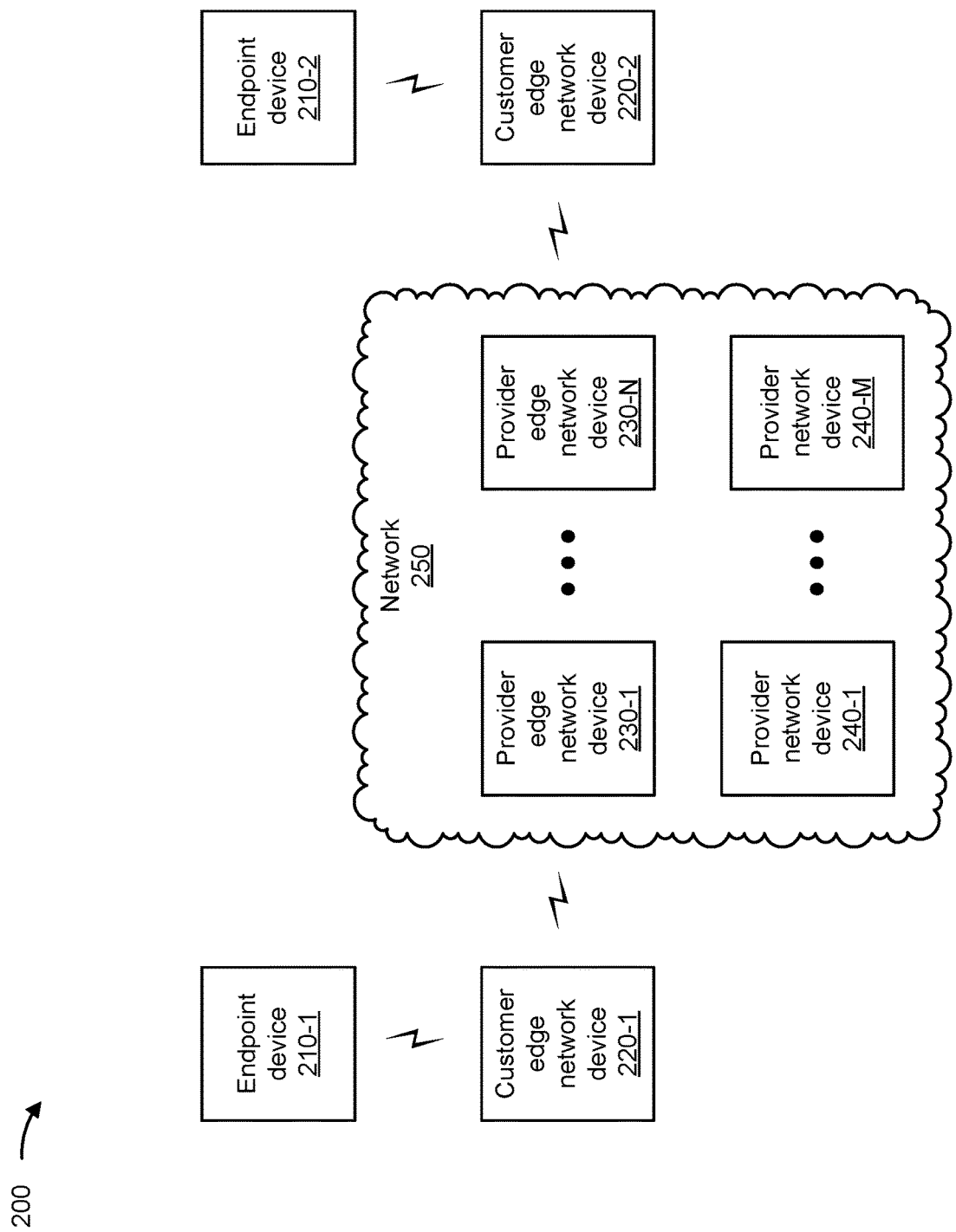
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a plurality of endpoint device 210 (shown as endpoint devices 210-1 and 210-2), a plurality of customer edge network devices 220 (shown as customer edge network devices 220-1 and 220-2), a plurality of provider edge network devices 230 (shown as provider edge devices 230-1 through 230-N, where N≥2), one or more provider network devices 230 (shown as provider edge devices 240-1 through 240-M, where M≥2), and a network 250. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 210 may receive network traffic from and/or may provide network traffic to other endpoint devices 210 via network 250 (e.g., by routing packets to customer edge network devices 220 and/or provider edge network devices 230 as intermediaries).

Customer edge network device 220 includes one or more devices capable of generating, sending, receiving, processing, storing, routing, and/or providing network traffic in a manner described herein. For example, customer edge network device 220 may include a firewall, a gateway, a switch, a hub, a bridge, a reverse proxy, a server (e.g., a proxy server), a security device, an intrusion detection device, a load balancer, or a similar type of device. Additionally, or alternatively, customer edge network device 220 may include a router, such as a label switching router (LSR), a label edge router (LER), an ingress router, an egress router, a provider router (e.g., a provider edge router or a provider core router), a virtual router, or another type of router. In some implementations, customer edge network device 220 may include a mobile phone (e.g., a smart phone or a radiotelephone), a laptop computer, a tablet computer, a desktop computer, a handheld computer, or a similar type of device. In some implementations, customer edge network device 220 may transmit network traffic to provider edge network device 230 and receive network traffic from provider edge network device 230, as described elsewhere herein. Customer edge network device 220 may be a physical device implemented within a housing, such as a chassis. In some implementations, customer edge network device 220 may be a virtual device implemented by one or more computer devices of a cloud computing environment or a data center.

Provider edge network device 230 includes one or more devices capable of receiving, processing, storing, routing, and/or providing network traffic in a manner described herein. For example, provider edge network device 230 may include a firewall, a gateway, a switch, a hub, a bridge, a reverse proxy, a server (e.g., a proxy server), a security device, an intrusion detection device, a load balancer, or a similar type of device. Additionally, or alternatively, provider edge network device 230 may include a router, such as an LSR, an LER, an ingress router, an egress router, a provider router (e.g., a provider edge router or a provider core router), a virtual router, or another type of router. In some implementations, provider edge network device 230 may transmit network traffic between the customer edge network device 220 and the network 250 as described elsewhere herein. Provider edge network device 230 may be a physical device implemented within a housing, such as a chassis. In some implementations, provider edge network device 230 may be a virtual device implemented by one or more computer devices of a cloud computing environment or a data center.

Provider network device 240 includes one or more devices capable of receiving, processing, storing, routing, and/or providing network traffic in a manner described herein. For example, provider network device 240 may include a firewall, a gateway, a switch, a hub, a bridge, a reverse proxy, a server (e.g., a proxy server), a security device, an intrusion detection device, a load balancer, or a similar type of device. Additionally, or alternatively, provider network device 240 may include a router, such as an LSR, an LER, an ingress router, an egress router, a provider router (e.g., a provider edge router or a provider core router), a virtual router, or another type of router. In some implementations, provider network device 240 may transmit network traffic between a first provider edge network device 230 and a second provider edge network device 230 and/or another provider network device 240 as described elsewhere herein. Provider network device 240 may be a physical device implemented within a housing, such as a chassis. In some implementations, provider network device 240 may be a virtual device implemented by one or more computer devices of a cloud computing environment or a data center.

Network 250 includes one or more wired and/or wireless networks. For example, network 250 may include a label-switched network, such as an MPLS network. Additionally, or alternatively, network 250 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
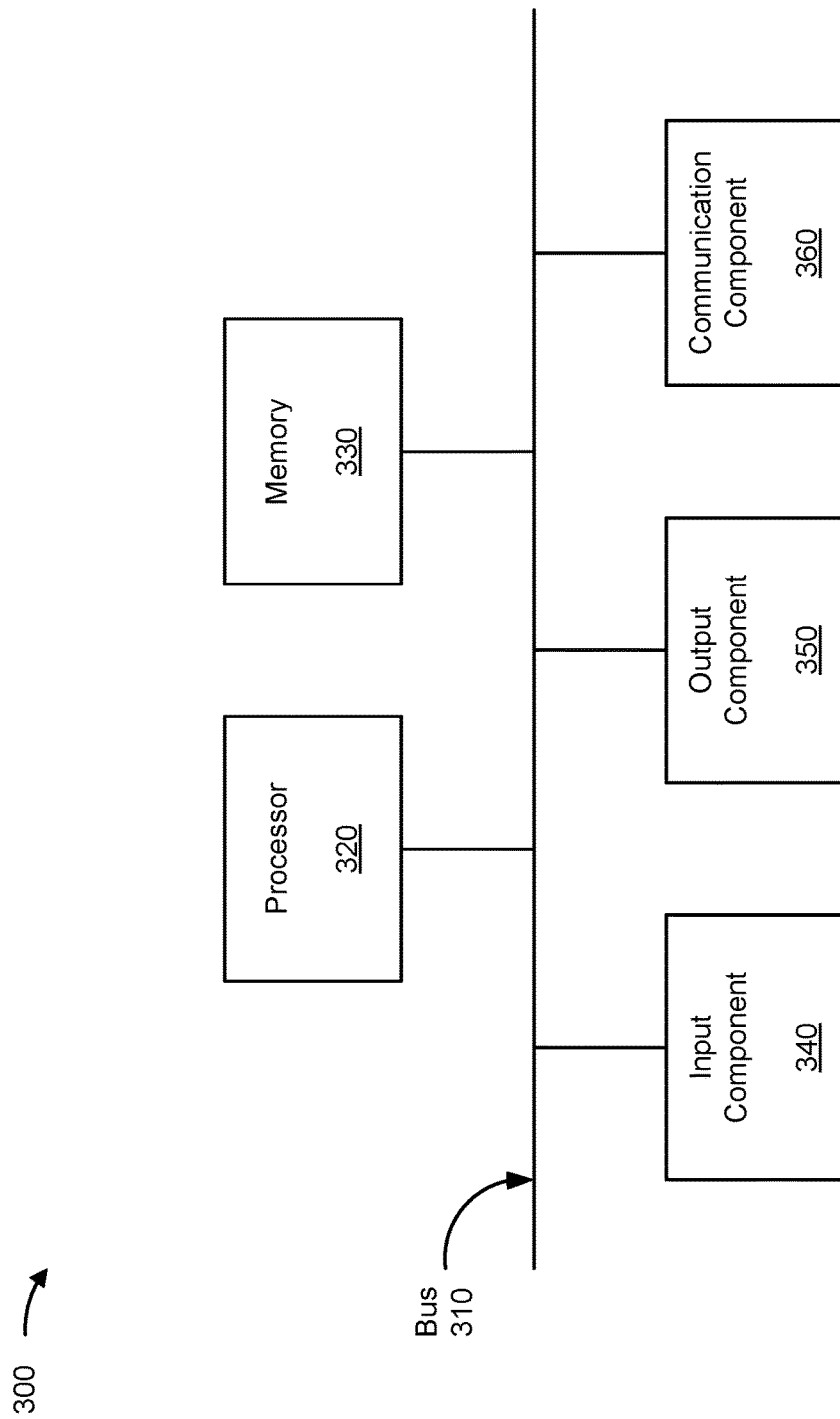
FIGS. 3 and 4 are diagrams of example components of one or more devices of FIG. 2.

FIG. 3 is a diagram of example components of a device 300, which may correspond to endpoint device 210, customer edge network device 220, and/or provider edge network device 230. In some implementations, endpoint device 210, customer edge network device 220, and/or provider edge network device 230 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
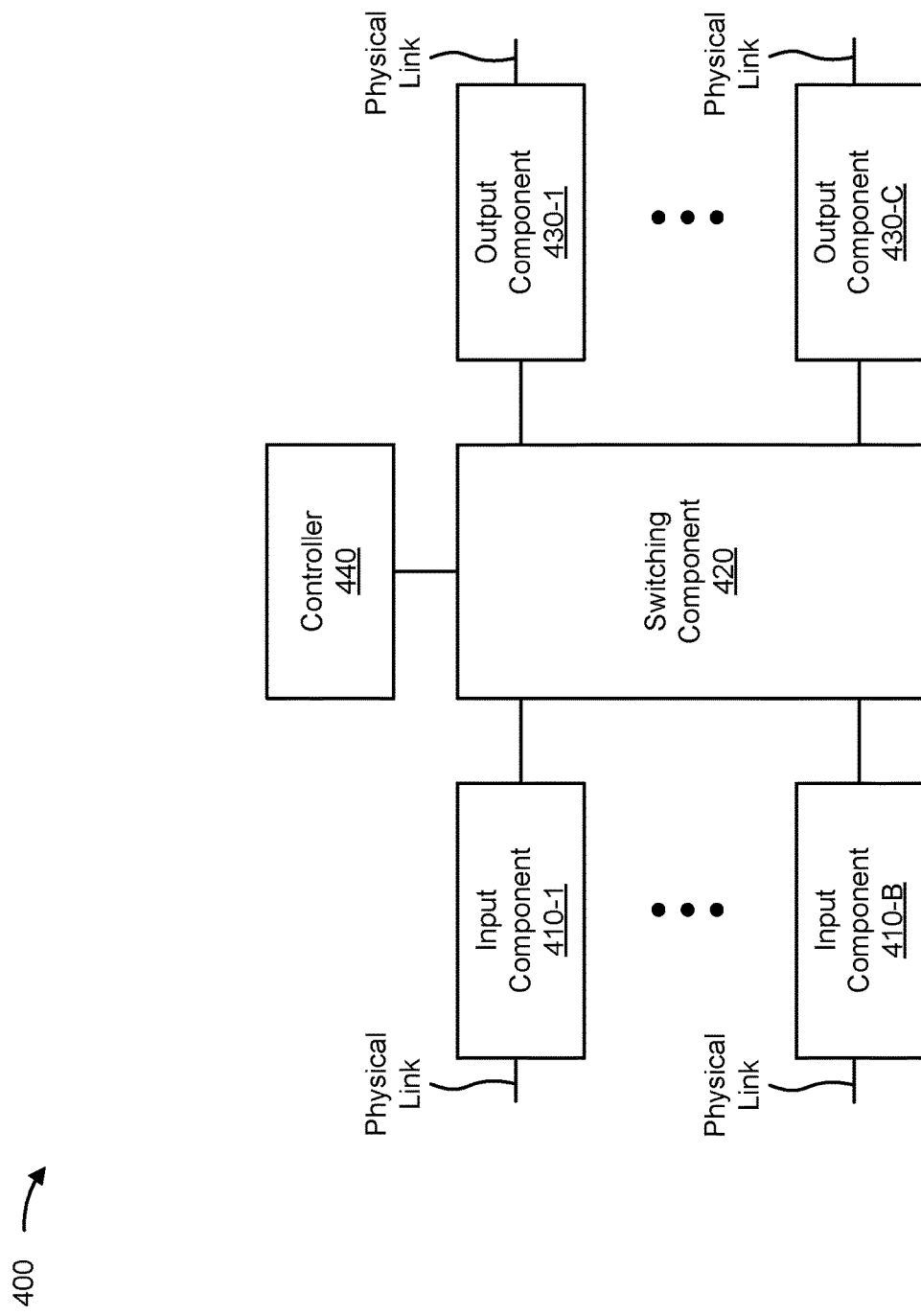

FIG. 4 is a diagram of example components of a device 400. Device 400 may correspond to endpoint device 210, customer edge network device 220, and/or provider edge network device 230. In some implementations, endpoint device 210, customer edge network device 220, and/or provider edge network device 230 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
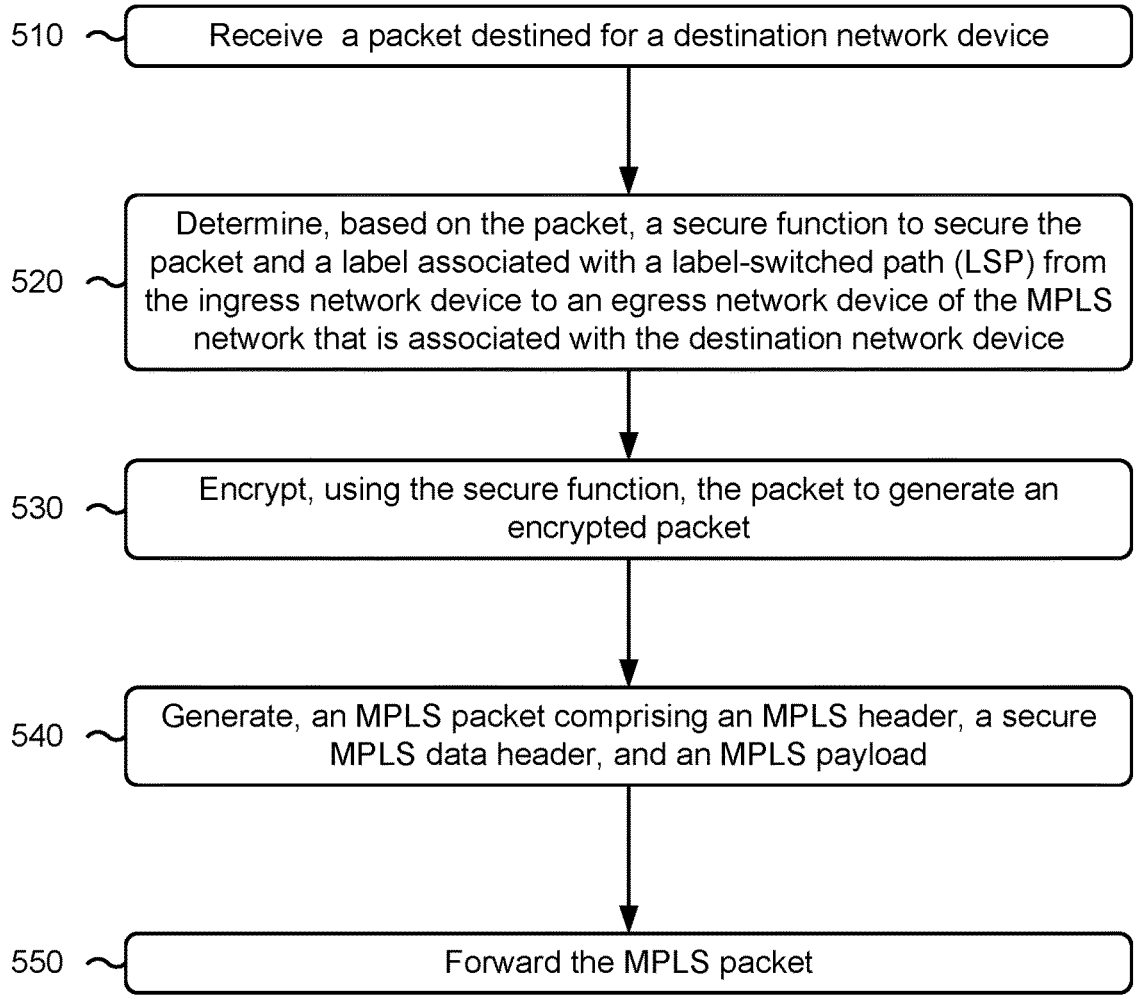
FIG. 5 is a flowchart of an example process relating to securing an MPLS payload.

FIG. 5 is a flowchart of an example process 500 associated with securing MPLS payloads. In some implementations, one or more process blocks of FIG. 5 are performed by an ingress network device (e.g., a provider edge network device 230) of an MPLS network. In some implementations, one or more process blocks of FIG. 5 are performed by another device or a group of devices separate from or including the network device, such as one or more other network devices (e.g., one or more customer edge network device 220 or one or more other provider edge network devices 230). Additionally, or alternatively, one or more process blocks of FIG. 5 may be performed by one or more components of device 300, such as processor 320, memory 330, input component 340, output component 350, and/or communication component 360; one or more components of device 400, such as input component 410-1, switching component 420, output component 430, and/or controller 440; and/or one or more components of another device.

As shown in FIG. 5, process 500 may include receiving a packet destined for a destination network device (block 510). For example, the ingress network device may receive a packet destined for a destination network device, as described above.

As further shown in FIG. 5, process 500 may include determining, based on the packet, a secure function to secure the packet and a label associated with a label-switched path (LSP) from the ingress network device to an egress network device of the MPLS network that is associated with the destination network device (block 520). For example, the ingress network device may determine, based on the packet, a secure function to secure the packet and a label associated with an LSP from the ingress network device to an egress network device of the MPLS network that is associated with the destination network device, as described above.

As further shown in FIG. 5, process 500 may include encrypting, using the secure function, the packet to generate an encrypted packet (block 530). For example, the ingress network device may encrypt, using the secure function, the packet to generate an encrypted packet, as described above.

As further shown in FIG. 5, process 500 may include generating an MPLS packet comprising: an MPLS header, a secure MPLS data header, and an MPLS payload (block 540). For example, the ingress network device may generate an MPLS packet comprising: an MPLS header that includes the label and a secure function indicator, a secure MPLS data header that includes information identifying the secure function, and an MPLS payload that includes the encrypted packet, as described above.

As further shown in FIG. 5, process 500 may include forwarding the MPLS packet (block 550). For example, the ingress network device may forward, based on the label, the MPLS packet, as described above.

Process 500 may include additional implementations, such as any single implementation or any combination of implementations described below and/or in connection with one or more other processes described elsewhere herein.

In a first implementation, the packet is a layer 2 packet or a layer 3 packet.

In a second implementation, alone or in combination with the first implementation, the secure function indicator indicates that the secure function provides hop-to-hop security or end-to-end security.

In a third implementation, alone or in combination with one or more of the first and second implementations, the information identifying the secure function includes at least one of a security parameter index value, a sequence number value, or an integrity check value.

In a fourth implementation, alone or in combination with one or more of the first through third implementations, process 500 includes communicating with, prior to receiving the packet, the egress network device to establish a security association between the ingress network device and the egress network device.

In a fifth implementation, alone or in combination with one or more of the first through fourth implementations, communicating with the destination network device comprises exchanging Internet key exchange (IKE) messages with the egress network device to establish the security association between the ingress network device and the egress network device.

In a sixth implementation, alone or in combination with one or more of the first through fifth implementations, process 500 includes receiving another packet destined for the destination network device; determining, based on the other packet, the label associated with the LSP from the ingress network device to the egress network device; determining, based on the other packet, that the other packet is to not be encrypted; generating, based on determining that the other packet is to not be encrypted, another MPLS packet comprising another MPLS header that includes the label, wherein the other MPLS header does not include another secure function indicator, and another MPLS payload that includes the other packet; and forwarding, based on the label, the other MPLS packet.

In a seventh implementation, alone or in combination with one or more of the first through sixth implementations, process 500 includes receiving another MPLS packet that includes another MPLS header, another secure MPLS data header, and another MPLS payload; processing the other MPLS header to determine a first other label associated with another LSP and another secure function indicator; determining, based on the other secure function indicator, that the ingress network device is to not decrypt the other MPLS payload of the other MPLS packet; generating, based on determining that the ingress network device is to not decrypt the other MPLS payload of the other MPLS packet a second other label associated with the other LSP; updating the other MPLS header of the other MPLS packet to include the second other label, and not the first other label; and forwarding, based on the second other label, the other MPLS packet.

In an eighth implementation, alone or in combination with one or more of the first through seventh implementations, process 500 includes receiving a first other MPLS packet that includes a first other MPLS header, a first other secure MPLS data header, and a first other MPLS payload; processing the first other MPLS header to determine a first other label associated with another LSP and another secure function indicator; determining, based on the first other label and the other secure function indicator, that the ingress network device is to decrypt the first other MPLS payload of the first other MPLS packet; identifying, based on determining that the ingress network device is to decrypt the first other MPLS payload and based on the first other secure MPLS data header, another secure function to decrypt the first other MPLS payload; decrypting, using the other secure function, the first other MPLS payload to generate a decrypted packet; and performing, based on the decrypted packet, one or more actions.

In a ninth implementation, alone or in combination with one or more of the first through eighth implementations, performing the one or more actions comprises forwarding, based on destination information included in the decrypted packet, the decrypted packet to another destination network device.

In a tenth implementation, alone or in combination with one or more of the first through ninth implementations, performing the one or more actions comprises encrypting, using the other secure function, the decrypted packet to generate a re-encrypted packet; generating a second other MPLS packet comprising a second other MPLS header that includes a second other label associated with the other LSP and the other secure function indicator, a second other secure MPLS data header that includes information identifying the other secure function, and a second other MPLS payload that includes the re-encrypted packet; and forwarding, based on the second other label, the second other MPLS packet.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   exchanging, by an ingress network device of a multiprotocol label switching (MPLS) network, Internet key exchange (IKE) messages with an egress network device of the MPLS network to establish a security association between the ingress network device and the egress network device;
   receiving, by the ingress network device, a packet destined for a destination network device;
   determining, by the ingress network device and based on the packet, a secure function to secure the packet and a label associated with a label-switched path (LSP) from the ingress network device to the egress network device, the egress network device being associated with the destination network device;
   encrypting, by the ingress network device and using the secure function, the packet to generate an encrypted packet;
   generating, by the ingress network, an MPLS packet comprising:
      an MPLS header that includes the label and a secure function indicator,
      a secure MPLS data header that includes information identifying the secure function, and
      an MPLS payload that includes the encrypted packet; and
   forwarding, by the ingress network device and based on the label, the MPLS packet.

2. The method of claim 1, wherein the packet is a layer 2 packet or a layer 3 packet.

3. The method of claim 1, wherein the secure function indicator indicates that the secure function provides hop-to-hop security or end-to-end security.

4. The method of claim 1, wherein the information identifying the secure function includes at least one of:
   a security parameter index value,
   a sequence number value, or
   an integrity check value.

5. The method of claim 1, wherein exchanging the IKE messages includes:
   exchanging, prior to receiving the packet, the IKE messages with the egress network device to establish the security association between the ingress network device and the egress network device.

6. The method of claim 1, further comprising:
   receiving another packet destined for the destination network device;
   determining, based on the other packet, the label associated with the LSP from the ingress network device to the egress network device;
   determining, based on the other packet, that the other packet is to not be encrypted;
   generating, based on determining that the other packet is to not be encrypted, another MPLS packet comprising:
      another MPLS header that includes the label,
         wherein the other MPLS header does not include another secure function indicator, and
      another MPLS payload that includes the other packet; and
   forwarding, based on the label, the other MPLS packet.

7. The method of claim 1, further comprising:
   receiving another MPLS packet that includes another MPLS header, another secure MPLS data header, and another MPLS payload;
   processing the other MPLS header to determine a first other label associated with another LSP and another secure function indicator;
   determining, based on the other secure function indicator, that the ingress network device is to not decrypt the other MPLS payload of the other MPLS packet;
   generating, based on determining that the ingress network device is to not decrypt the other MPLS payload of the other MPLS packet, a second other label associated with the other LSP;
   updating the other MPLS header of the other MPLS packet to include the second other label, and not the first other label; and
   forwarding, based on the second other label, the other MPLS packet.

8. The method of claim 1, further comprising:
   receiving a first other MPLS packet that includes a first other MPLS header, a first other secure MPLS data header, and a first other MPLS payload;
   processing the first other MPLS header to determine a first other label associated with another LSP and another secure function indicator;
   determining, based on the first other label and the other secure function indicator, that the ingress network device is to decrypt the first other MPLS payload of the first other MPLS packet;
   identifying, based on determining that the ingress network device is to decrypt the first other MPLS payload and based on the first other secure MPLS data header, another secure function to decrypt the first other MPLS payload;
decrypting, using the other secure function, the first other MPLS payload to generate a decrypted packet; and
performing, based on the decrypted packet, one or more actions.

9. The method of claim 8, wherein performing the one or more actions comprises:
forwarding, based on destination information included in the decrypted packet, the decrypted packet to another destination network device.

10. The method of claim 8, wherein performing the one or more actions comprises:
encrypting, using the other secure function, the decrypted packet to generate a re-encrypted packet;
generating a second other MPLS packet comprising:
a second other MPLS header that includes a second other label associated with the other LSP and the other secure function indicator,
a second other secure MPLS data header that includes information identifying the other secure function, and
a second other MPLS payload that includes the re-encrypted packet; and
forwarding, based on the second other label, the second other MPLS packet.

11. A non-transitory computer-readable medium storing a set of instructions, the set of instructions comprising:
one or more instructions that, are executed by one or more processors of an ingress network device of a multiprotocol label switching (MPLS) network, to cause the ingress network device to:
exchange Internet key exchange (IKE) messages with an egress network device of the MPLS network to establish a security association between the ingress network device and the egress network device;
receive a packet destined for a destination network device;
encrypt, using a secure function, the packet to generate an encrypted packet;
generate an MPLS packet comprising:
an MPLS header that includes:
a label associated with a label-switched path (LSP) from the ingress network device to an egress network device of the MPLS network that is associated with the destination network device, and
a secure function indicator,
a secure MPLS data header that includes information identifying the secure function, and
an MPLS payload that includes the encrypted packet; and
forward, based on the label, the MPLS packet.

12. The non-transitory computer-readable medium of claim 11, wherein the one or more instructions further cause the ingress network device to:
receive another packet destined for the destination network device;
generate another MPLS packet comprising:
another MPLS header that includes the label, and
another MPLS payload that includes the other packet, wherein the other packet is not encrypted; and
forward, based on the label, the other MPLS packet.

13. The non-transitory computer-readable medium of claim 11, wherein the one or more instructions further cause the ingress network device to:
receive another MPLS packet that includes another MPLS header, another secure MPLS data header, and another MPLS payload;
process the other MPLS header to determine a first other label associated with another LSP and another secure function indicator;
generate, based on the other secure function indicator, a second other label associated with the other LSP;
update the other MPLS header of the other MPLS packet to include the second other label, and not the first other label; and
forward, based on the second other label, the other MPLS packet.

14. The non-transitory computer-readable medium of claim 11, wherein the one or more instructions further cause the ingress network device to:
receive another MPLS packet that includes another MPLS header, another secure MPLS data header, and another MPLS payload;
decrypt, using another secure function indicated by the other secure MPLS data header, the other MPLS payload to generate a decrypted packet; and
forward, based on destination information included in the decrypted packet, the decrypted packet to another destination network device.

15. The non-transitory computer-readable medium of claim 11, wherein the one or more instructions further cause the ingress network device to:
receive a first other MPLS packet that includes a first other MPLS header, a first other secure MPLS data header, and a first other MPLS payload;
decrypt, using another secure function indicated by the first other secure MPLS data header, the first other MPLS payload to generate a decrypted packet;
encrypt, using the other secure function, the encrypted packet to generate a re-encrypted packet; and
generate a second other MPLS packet comprising:
a second other MPLS header,
a second other secure MPLS data header that includes information identifying the other secure function, and
a second other MPLS payload that includes the re-encrypted packet; and
forward the second other MPLS packet.

16. A network device, comprising:
one or more memories; and
one or more processors to:
exchange Internet key exchange (IKE) messages with an egress network device of an multiprotocol label switching (MPLS) network to establish a security association between the network device and the egress network device;
receive a packet destined for a destination network device;
encrypt, using a secure function, the packet to generate an encrypted packet;
generate an MPLS packet comprising:
an MPLS header that includes a secure function indicator,
a secure MPLS data header that includes information identifying the secure function, and
an MPLS payload that includes the encrypted packet; and
forward the MPLS packet.

17. The network device of claim 16, wherein the one or more processors are further to:

receive another packet destined for the destination network device;
generate another MPLS packet comprising:
  another MPLS header that does not include the secure function indicator, and
  another MPLS payload that includes the packet; and
forward the other MPLS packet.

18. The network device of claim 16, wherein the one or more processors are further to:
receive another MPLS packet that includes another MPLS header that comprises a first other label, another secure MPLS data header, and another MPLS payload;
update the other MPLS header of the other MPLS packet to include a second other label, and not the first other label; and
forward the other MPLS packet.

19. The network device of claim 16, wherein the one or more processors are further to:
receive another MPLS packet that includes another MPLS header, another secure MPLS data header, and another MPLS payload;
decrypt the other MPLS payload to generate a decrypted packet; and
forward the decrypted packet to another destination network device.

20. The network device of claim 16, wherein the one or more processors are further to:
receive a first other MPLS packet that includes a first other MPLS header, a first other secure MPLS data header, and a first other MPLS payload;
decrypt, using another secure function indicated by the first other secure MPLS data header, the first other MPLS payload to generate a decrypted packet;
encrypt, using the other secure function, the encrypted packet to generate a re-encrypted packet; and
generate a second other MPLS packet comprising:
  a second other MPLS header,
  a second other secure MPLS data header that includes information identifying the other secure function, and
  a second other MPLS payload that includes the re-encrypted packet; and
forward the second other MPLS packet.

\* \* \* \* \*